US012083945B2

(12) United States Patent
Tietz et al.

(10) Patent No.: US 12,083,945 B2
(45) Date of Patent: Sep. 10, 2024

(54) SELF-PROPELLED BOAT LAUNCH VEHICLE

(71) Applicant: Beachworks, LLC, Mequon, WI (US)

(72) Inventors: Roger James Tietz, Cedarburg, WI (US); Jonathon D Nemke, New Berlin, WI (US); Michael W Kawalske, New Berlin, WI (US)

(73) Assignee: Beachworks, LLC, Mequon, WI (US)

( * ) Notice: Subject to any disclaimer, the term of this patent is extended or adjusted under 35 U.S.C. 154(b) by 1017 days.

(21) Appl. No.: 17/009,937

(22) Filed: Sep. 2, 2020

(65) Prior Publication Data
US 2021/0070212 A1 Mar. 11, 2021

Related U.S. Application Data

(60) Provisional application No. 62/898,591, filed on Sep. 11, 2019.

(51) Int. Cl.
*B60P 3/10* (2006.01)
(52) U.S. Cl.
CPC .......... *B60P 3/1058* (2013.01); *B60P 3/1066* (2013.01); *B60P 3/1075* (2013.01)
(58) Field of Classification Search
CPC ..... B60P 3/1058; B60P 3/1066; B60P 3/1075; B62D 55/0882
See application file for complete search history.

(56) References Cited

U.S. PATENT DOCUMENTS

| 4,134,622 A | * | 1/1979 | Krolak | B62D 55/0882 305/110 |
| 4,198,103 A | * | 4/1980 | Ward | B62D 55/08 180/9.1 |
| 4,235,479 A | * | 11/1980 | Puglise | B62D 55/0882 305/109 |
| 4,265,494 A | * | 5/1981 | Matsubara | B62D 55/0882 305/139 |

(Continued)

FOREIGN PATENT DOCUMENTS

| CA | 2509246 | 7/2009 |
| EP | 1588937 | 10/2005 |

(Continued)

*Primary Examiner* — Kevin Hurley
*Assistant Examiner* — Michael R Stabley
(74) *Attorney, Agent, or Firm* — RYAN KROMHOLZ & MANION, S.C.

(57) ABSTRACT

The present invention is to a self-propelled boat launch and methods of operating components of the boat launch a launch vehicle. The launch vehicle includes a partially submersible generally frame. The frame comprises a front frame unit and a modular carriage frame section, comprising at least one modular carnage frame. The boat launch is self-propelled with track assemblies driven by a hydraulic system powered by an engine assembly. The engine assembly is preferably mounted on top of the front frame unit. At least two track assemblies are in removable communication with a modular carriage frame. A track tensioner is provided for increased tension on a continuous track of the track assembly. A track cleaner is described for removal of foreign objects from at least one track assembly. Further, a method of operating the track tensioner is described. A method of operating the track cleaner is described.

5 Claims, 11 Drawing Sheets

(56) References Cited

U.S. PATENT DOCUMENTS

| | | | | |
|---|---|---|---|---|
| 4,830,439 A | * | 5/1989 | Collins | B62D 55/088 |
| | | | | 305/110 |
| 6,079,729 A | | 6/2000 | Braun | |
| 6,267,458 B1 | * | 7/2001 | Hansen | B62D 55/0845 |
| | | | | 305/108 |
| 6,341,793 B2 | | 1/2002 | Braun | |
| 6,578,934 B2 | * | 6/2003 | Ito | B62D 55/0882 |
| | | | | 305/110 |
| 7,147,240 B2 | | 12/2006 | Naito | |
| 7,588,107 B2 | * | 9/2009 | Nicholes | B62D 59/04 |
| | | | | 180/9.3 |
| 7,832,814 B2 | * | 11/2010 | Breton | B62D 55/088 |
| | | | | 305/110 |
| 7,997,827 B2 | | 8/2011 | Fogg | |
| 10,562,575 B2 | * | 2/2020 | Holowachuk | B62D 55/0882 |
| 11,535,144 B2 | * | 12/2022 | Pira | B63C 3/12 |
| 2010/0247279 A1 | * | 9/2010 | Robert I Boluda | B60P 3/1083 |
| | | | | 414/529 |

FOREIGN PATENT DOCUMENTS

| | | |
|---|---|---|
| JP | 2004262255 | 9/2004 |
| WO | WO2004063002 | 10/2004 |

\* cited by examiner

SELF-PROPELLED BOAT LAUNCH VEHICLE

RELATED APPLICATIONS

This application claims the benefit of co-pending Provisional Application Ser. No. 62/898,591 filed 11 Sep. 2019.

BACKGROUND OF THE INVENTION

This invention relates to a mechanism for releasing boats and other small watercraft into the water. More specifically, this invention relates to a vehicle for releasing boats and other small watercraft into the water. More specifically, this invention relates to a self-propelled boat launch vehicle for releasing boats and other small watercraft into the water.

The use of trailers in the transportation and launching of beats and other small watercraft is well known. Conventional boat trailers consist of a wheel supported metal frame upon which a crib or boat bunk is mounted to support the boat hull. Conventional trailers are provided with a hitch coupling at a front end which permits the trailer to be secured to a vehicle-mounted trailer hitch for transport. In launching a boat, with the hitch coupling secured to a vehicle, the rear end of the trailer is backed down a public or marina ramp until the bear bunk is submerged to a sufficient extent that the boat can be floated clear of the trailer. The empty trailer is then pulled from the lake and must be stored until such time as the boat is to be retrieved for transport elsewhere.

In addition to the expense and inconvenience of storage, conventional boat trailers suffer a disadvantage in that the combined weight of the boat and trailer typically necessitates that only larger vehicles, such as pick-up trucks or sport utility vehicles, may be used to transport and launch the boat from the trailer.

In addition, if the launch ramp is privately owned, users may be liable to pay launch fees for its use. Public launch ramps are frequently inconveniently located, acquiring that the boat be driven up to tens of miles to and from the boat launch site to its mooring. As a practical matter, when small watercraft and boats are moored at a dock, it often is not possible to safely pilot the watercraft over long distances to a public launch ramp for removal and sheltering during sudden storms.

In an effort to overcome at least some of the disadvantages associated with conventional boat trailers, various individuals have proposed boat railway systems which are designed to enable individuals to remove boats from lakes and rivers without the difficulties associated with trailers. Boat railway systems are unsightly, however, and involve the laying of parallel steel railroad rails on sleepers from a user's boat house a distance into the lake or river. Boats are raised and lowered from the lake by positioning the boat onto a wheeled sled and winching the sled along the rails. Railway systems are quite expensive and may cost thousands of dollars. In addition, if the railways are not removed from northern lakes and rivers each winter, they may be susceptible to ice damage and fouling by sedimentation. Permanent railway systems also require relatively constant water levels and may also be prohibited by building or environmental restrictions, or even bottom or surf conditions.

In an effort to overcome disadvantages of conventional boat trailers and boat railway systems, some have proposed self-propelled wheeled systems have been proposed. In launching a boat, with a self-propelled wheeled systems, the self-propelled wheeled system carrying the boat or small watercraft is driven such that a rear end of the self-propelled wheeled system is backed down an incline, where paved or unpaved, until the boat bunk is submerged to a sufficient extent that the boat can be floated clear of the self-propelled wheeled system. The empty self-propelled wheeled system is then driven from the lake and stored until such time as the boat is to be retrieved. The self-propelled wheeled system confronts problems similar to that of the trailers, in particular the unpredictable and often soft bed of the body of water. Due to the weight of the boat, the wheels may become lodged in the bed of the body of water.

In an effort to overcome disadvantages of self-propelled wheeled systems, some have proposed self-propelled tracked systems. The self-propelled track systems work similarly to that of the self-propelled wheel systems. However, tracks are applied in the place of wheels. The tracks reduce the pressure placed upon the bed of the body of water. However, track assemblies of the self-propelled track systems of the prior art become clogged and filled with repeated use due to the soft and unpredictable bed of the body of water. Further, the soft and unpredictable bed of the body of water puts wear upon the tracks resulting in expansion of the tracks. Expansion of the tracks will lead to reduced ability of the self-propelled tracked system to maneuver. Additionally, the tracks themselves can become out of alignment resulting in the system breaking down.

Further, the design of trailers and self-propelled systems requires a manufacturer or operator to use unrelated components to make trailer or self-propelled systems or different sizes. The cost of production and time for production therefore increases due to the need to design redundant components that have different design specifications.

A need exists for a track cleaner to reduce the amount of foreign objects in the track assembly allowing for continued and sustained operation of a self-propelled boat launch vehicle.

A need exists for a track tensioner to maintain operational tension on individual tracks in the track assembly allowing for continued and sustained operation of a self-propelled boat launch vehicle.

A need exists for a modular carriage frame construction to allow for multiple models of different sizes to be produced with the same components.

A need exists for a construction allowing for extensions to be applied to address boats and small watercraft of various sizes.

SUMMARY OF THE INVENTION

The present invention relates to a self-propelled boat launch vehicle for releasing boats and other small watercraft into the water. The present invention seeks to overcome at least some of the prior art disadvantages by providing a boat, launching vehicle, adapted to travel over uneven terrain to launch or retrieve a boat, which provides for elements to provide for the survivability of the track assemblies used on the self-propelled boat launch vehicle.

Another object of the present invention seeks to overcome at least some of the prior art disadvantages by providing a boat launching vehicle composed of modular carriage frames.

Another object of the invention is to provide a boat launch vehicle which is self-propelled and which may be used to either transport, store and/or launch boats and other small watercraft from a lake, river, ocean, reservoir or other water body (collectively referred to as a "lake").

A further object of the invention is to provide a self-propelled boat launch trailer which may be moved over sand, logs, rocks or uneven terrain to launch or remove a boat from a body of water. A further object of the invention is to provide a partially submersible boat launch vehicle which provides a raised platform on which a boater may stand or walk when entering or exiting from a boat or small watercraft.

Another object of the invention is to provide a vehicle for launching and retrieving boats from lakes, which is adapted to travel over shoreline banks and/or lake beds, without requiring installation of specialized rail systems or permanent lift structures.

The present invention provides a launch vehicle for boats, jet skis or other small watercraft, and which hereafter are collectively referred to as boats. The launch vehicle includes a partially submersible modular frame which is movably mounted on track assemblies. The vehicle modular frame has a lateral width and longitudinal length selected to enable a boat to be supported thereon. The frame supports a boat cradle or bunk which is configured to engagingly support the bottom sides of a boat hull thereon daring its transportation and storage.

The invention specifically provides for a first embodiment of the self-propelled boat launch vehicle, a second embodiment of the self-propelled boat launch vehicle and a third embodiment of the self-propelled boat launch vehicle. The launch vehicle includes a partially submersible generally planar frame. The frame preferably comprises at least one of aluminum, carbon steel, stainless steel and a coated or painted steel. The frame is elongated in a longitudinal direction to enable the boat to be supported or trailered thereon. The frame comprises a front frame unit and a modular carriage frame section, comprising at least one modular carriage frame. It is observed that connection of the modular carriage frames may be provided by at least one of a connection bracket and an extension bracket. It is observed multiple modular carriage frames may be employed for extended length of the self-propelled boat launch vehicle.

It is observed the extension brackets provide for an intended benefit of this invention which is a construction allowing for extensions to be applied to address boats and small watercraft of various sizes.

It is observed the modular carriage frames provide for an intended benefit of this invention which is a modular carriage frame construction to allow for multiple models of different sites to be produced with the same components.

The boat launch vehicle is self-propelled with the track assemblies driven by a hydraulic system which is powered by an engine assembly, wherein the hydraulic system provides hydraulic power to at least one hydraulic motor in at least one of the track assemblies. The engine assembly comprises an engine assembly base plate supporting at least one of the engine/pump combination, a hydraulic tank, and a manifold. Wherein an engine of the engine pump combination is at least one of a diesel engine, and electric engine, and a solar engine. It is observed the diesel engine is preferred. At least one of the hydraulic tank and the hydraulic pump is fluidly connected to the manifold, wherein hydraulic fluid is transferred to the manifold. The manifold provides for distribution of the hydraulic fluid in a manner dependent upon commands received by a remote control. Two embodiments of the manifold are described.

The engine assembly is mounted at a position vertically above the submersible bunk so as to maintain it in a position above the lake surface while the boat bunk is sufficiently submerged to permit the boat to float free of the vehicle during its launching, docking and retrieval Most preferably, the engine assembly is mounted on top of a vertically extending front frame unit located at a forward end of the launch vehicle. The front frame unit extends upwardly from the modular frame, such that the motor is maintained at a position above the water surface adjacent at the shoreline during boat launching. Alternatively, the engine assembly may be mounted along at least one of a modular first side and a modular carriage frame second side of at least one modular carriage frame.

At least one track assembly is in removable communication with a modular carriage frame first side. At least one track assembly is in removable communication with a modular carriage frame second side.

A walkway may be provided on at least one of the second embodiment of the self-propelled boat launch and the third embodiment of the self-propelled boat launch. A staircase or ladder (collectively referred to as a "staircase/ladder") extends from a walkway first end to provide for access to the walkway. The at least one of the walkway and staircase/ladder are fixed to the at least one of the frame, track assembly and guide bars thru at least one walkway support. The guide bars are removably secured to the frame thru mounting brackets. The guide bars may be telescoping to provide for varying sizes of boats.

A track tensioner is provided for each of the track assemblies as described. The track tensioner provides for increased tension on a continuous track of the track assembly. The increased tension on the continuous track provides for at least one of maintaining traction and increased traction of the self-propelled boat launch.

An improved self-propelled boat launch vehicle for launching or docking a boat in water including a submersible longitudinally elongated frame, in which the frame is movably supported on each longitudinal side by at least one track assembly having a track, in which the track assembly comprises an idler wheel for a rotation of the track, wherein the improvement comprises: a tensioner fixed to the track assembly and in close proximity to a track first end; the tensioner comprises a first guide assembly and a second guide assembly, wherein the first guide assembly and the second guide assembly are positioned at least substantially parallel to a track length; the first guide assembly and the second guide assembly are positioned about the idler wheel; a bracket is in slidable communication with at least one of the first guide assembly and the second guide assembly; and the bracket is in removable communication with the idler wheel, wherein the bracket provides for movement of the idler wheel and an extension of the track.

The improved self-propelled boat launch vehicle further comprises: a cavity defined by the first guide assembly and the second guide assembly, wherein the cavity provides for the idler wheel; a bolt in communication with the bracket, wherein movement of the bolt provides for movement of the bracket; the bracket comprises at least one of arm, wherein the arm is in slidable communication with at least one of the first guide assembly and the second guide assembly; at least one plane extended from the idler wheel, wherein the plate is in slidable communication, with at least one of the first guide assembly and the second guide assembly; and the at least one arm in removable communication with the at least one plate to provide for movement of the idler wheel and the extension of the track.

Further, a method of operating a tensioner for a track assembly for an improved self-propelled boat launch vehicle, comprises: advancing a bolt in a track assembly first direction; advancing a bracket in the track assembly first direction, wherein the bolt is affixed to the bracket; the bracket removably contacting an idler wheel; advancing the idler wheel in the track assembly first direction; and maintaining at least one of the bolt and the bracket; in a fixed position.

The method further comprising: rotating the bolt in at least one of a clockwise and a counterclockwise direction; advancing the bracket thru the rotation of the bolt; the bracket removably contacting at least one plate, wherein the plate is in connection with the idler wheel; advancing the at least one plate in the track assembly first direction; at least one locking nut maintaining at least one of the bolt and the bracket in the fixed position; and the at least; one locking nut in threaded communication with the bolt.

A track cleaner is described for removal of foreign objects from at least one track assembly. The track cleaner involves an improved self-propelled boat launch vehicle for launching or docking a boat in water including a submersible longitudinally elongated frame, in which the frame being movably supported on each longitudinal side by at least one track assembly having a track, in which said track assembly comprising a drive sprocket for a rotation of the track, wherein the improvement comprises: a track cleaner fixed to the track assembly and in close proximity to the drive sprocket; the track cleaner comprising a cleaner plate and a foot in fixed communication; and the cleaner plate comprising a concave surface positioned proximate to a drive sprocket outer circumference.

The track cleaner further comprising: the foot comprises an angled surface positioned in close proximity to the drive sprocket outer circumference; at least one of the cleaner plate and the foot in alignment with the drive sprocket outer circumference; the concave surface proximate to at least one drive tooth positioned defining the drive sprocket outer circumference, wherein the tooth rotates in close proximity to the concave surface; the foot fixed to a cleaner plate first end; the foot proximate to a track interior surface; and the track cleaner is providing for removal of at least one object during the rotation of the track.

A method of operating the track cleaner is described.

Boats are launched either stern first or essentially the same manner as with conventional boat trailers. To launch or retrieve the boat from the lake, the launch vehicle is moved into a lake so that part of the frame and the boat bunk moved to a sufficient extent to enable the boat to float free of the bunk. When launching the boat, the vehicle is moved into the water so that the bunk submerges and the forward end of the vehicle carrying the motor remains at or immediately perpendicular to the shore line. As the vehicle enters the water, the frame partially submerges enabling the boat to float free of the bunk. Because the motor and the walkway, where used in at least one of a second embodiment of the self-propelled boat launch vehicle and a third embodiment of the self-propelled boat launch vehicle, are spaced vertically relative to the bunk, they are maintained substantially above the lake surface. The launch vehicle advantageously is moved up onto the shore line daily, protecting the boat and vehicle from wave action, algae and corrosion. To remove the boat, the boat is moved over the submerged portion of the launch vehicle in essentially the same manner as with a conventional trailer, and is tethered in place directly above the bunk. The motor is then activated to drive the launch vehicle together with the boat from the lake. As the vehicle moves from the lake, the boat hull is positioned relative to the bunk and the launch vehicle may be housed for storage with the boat resting on the boat bunk.

An intended benefit of this invention is to provide for a track cleaner to reduce the amount of foreign objects in the track assembly allowing for continued and sustained operation of a self-propelled boat launch vehicle.

An intended benefit of this invention is to provide for a track tensioner to maintain operational tension on individual tracks in the track assembly allowing for continued and sustained operation of a self-propelled boat launch vehicle.

An intended benefit of this invention is to provide for a modular carriage frame construction to allow for multiple models of different sizes to be produced with the same components.

An intended benefit of this invention is to provide for a construction allowing for extensions to be applied to address boats and small watercraft of various sizes.

DESCRIPTION OF THE PREFERRED EMBODIMENT

Although the disclosure hereof is detailed and exact to enable those skilled in the art to practice the invention, the physical embodiments herein disclosed merely exemplify the invention which may be embodied in other specific structures. While the preferred embodiment has been described, the details may be changed without departing from the invention.

Figure 1:
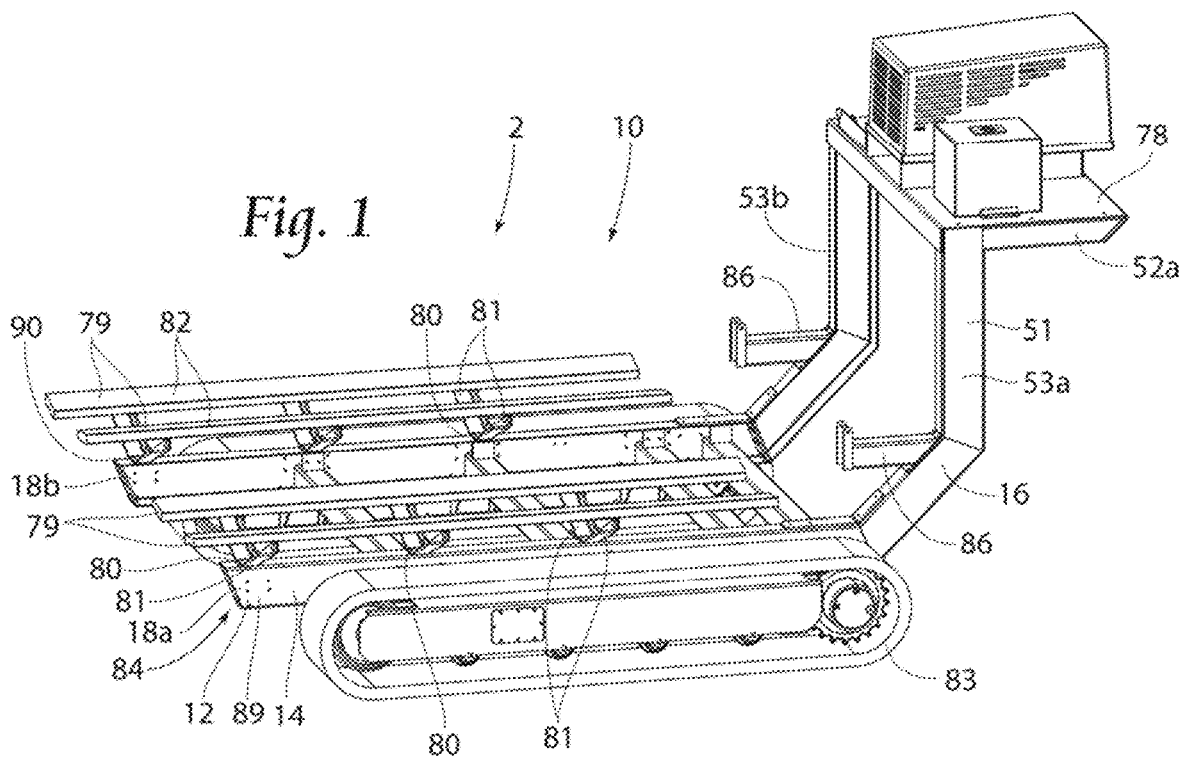
FIG. 1 is a perspective view of a first embodiment of a self-propelled boat launch vehicle of the present invention.
Figure 2:
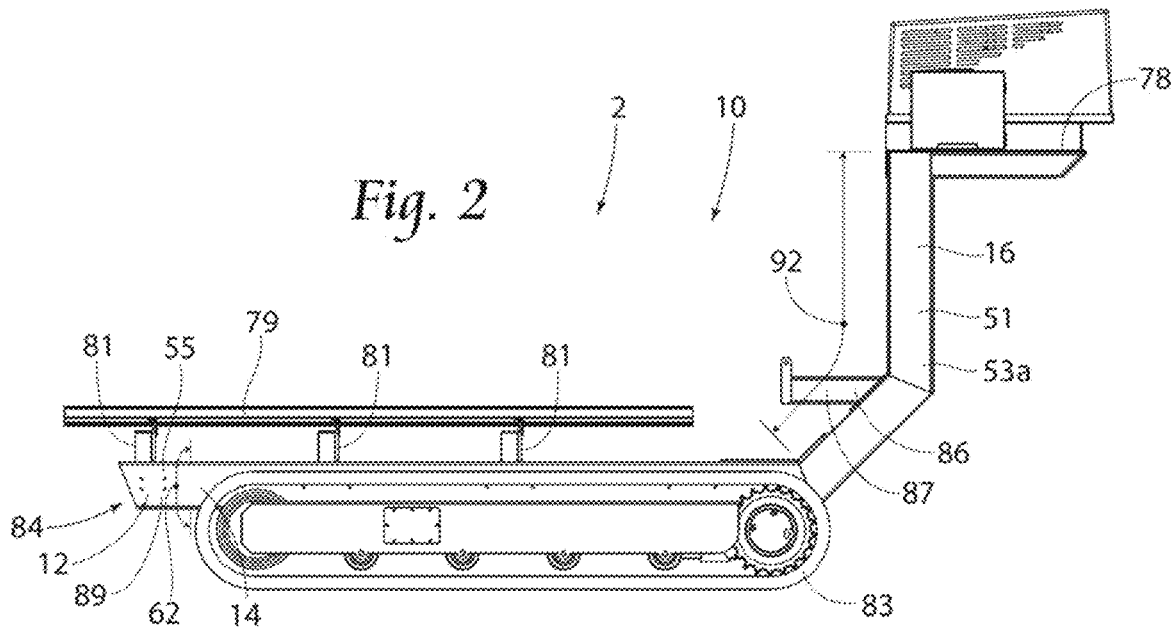
FIG. 2 is a side view of the first embodiment of the self-propelled boat launch vehicle of the present invention.
Figure 3:
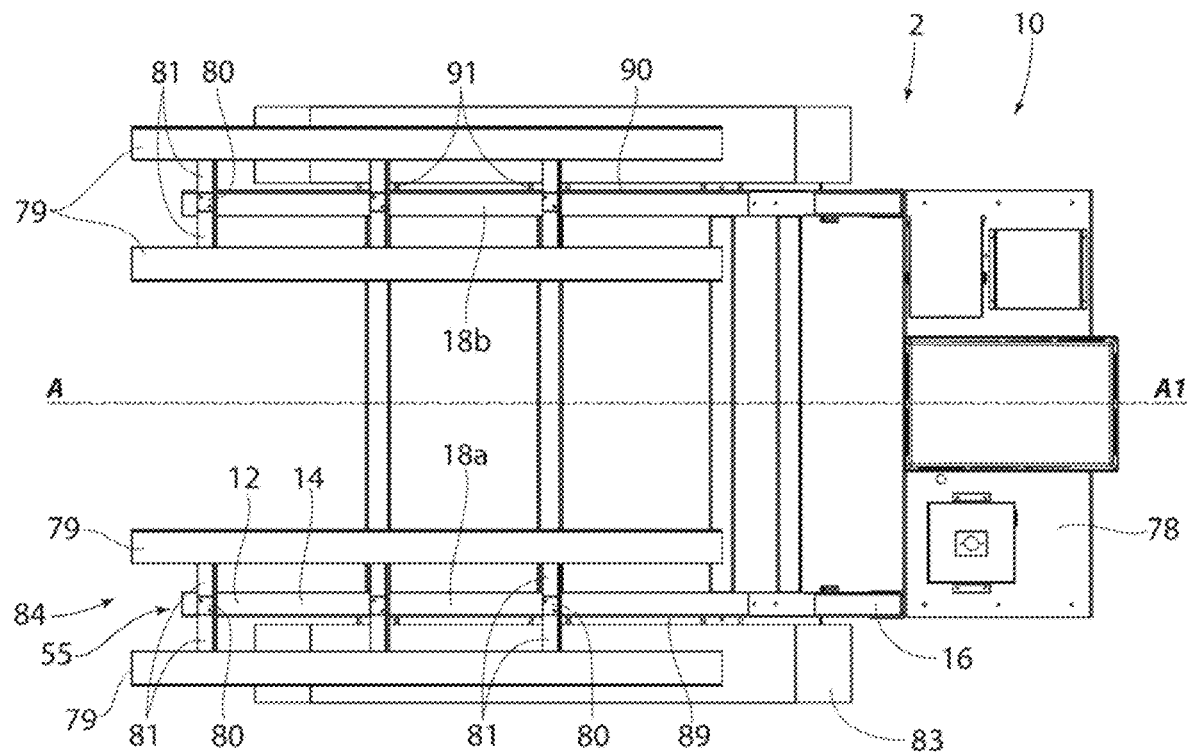
FIG. 3 is a top plan view of the first embodiment of the self-propelled boat launch vehicle of the present invention.

With respect to FIGS. 1 to 3, a self-propelled boat launch vehicle 2, specifically a first embodiment of a self-propelled boat launch vehicle 10, used in the transportation, storage, launching and/or docking of at least one of a boat and a small watercraft (not illustrated in the figures). The launch vehicle (2, 10) includes a partially submersible generally planar frame 14. The frame 14 preferably comprises at least one of aluminum, carbon steel, stainless steel and a coated or painted steel. The frame 14 is elongated in a longitudinal direction to enable the boat (not illustrated in the figures) to be supported or trailered thereon.

Figure 4A:
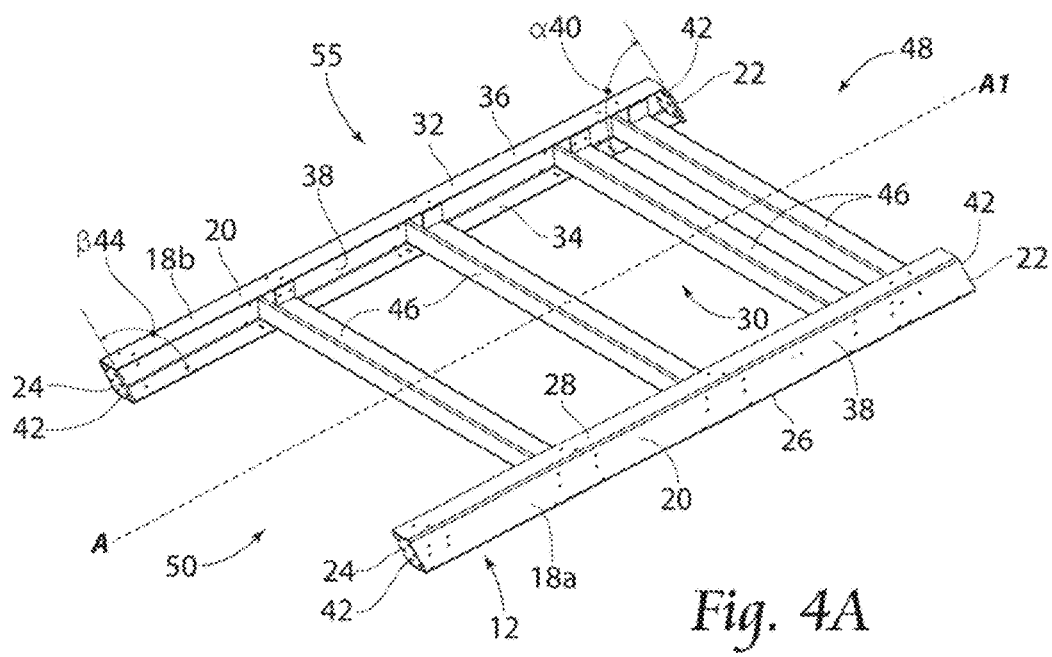
FIG. 4A is a perspective view of a modular carriage frame of the self-propelled boat launch vehicle of the present invention.

With attention to FIGS. 3, and 4A to 4E, the frame 14 is illustrated. As illustrated in FIG. 3, the frame 14 is generally symmetrical about a longitudinal center axis A-A1. The frame 14 comprises a front frame unit 16 and a modular carriage frame section 55, comprising at least one modular carriage frame 12. As illustrated in FIG. 4A, the modular carriage frame 12 comprises a first side 26 and a second side 28. Wherein the second side 28 provides a carrying area 30 upon which a boat or small watercraft (not illustrated in the figures) is supported. The modular carriage frame 12 comprises two longitudinal frame rails (18a, 18b) extending from a modular carriage frame first end 48 to a modular carriage frame second end 50. Where frame rails (18a, 18b) are at least substantially parallel to the longitudinal center axis A-A1, and the frame rails (18a, 18b) are separated, equidistant from, the longitudinal center axis A-A1. Each frame rail (18a, 18b) preferably comprises a single rail unit 20. Alternatively, each frame rail (18a, 18b) may comprise multiple rail units (not illustrated in the figures). Each frame rail (18a, 18b) has a frame rail first end 22 and an opposite frame rail second end 24. The frame rail first end 22 and the frame rail second end 24 are oppositely opposed and separated by a frame rail body 32. The frame rail body 32 is at least one of hollow or substantially hollow, and comprises a first body side 34 and oppositely opposed second body side 36. At least one of the first body side 34 and the second body side 36 extend at least substantially between the frame rail first end 22 and the frame rail second end 24. A body side plate 38 is in fixed, preferably welded, communication with the first body side 34 and the second body side 36 at least substantially between the frame rail first end 22 and the frame rail second end 24.

The frame rail first end 22 and the frame rail second end 24 provide for end plates 42. The frame rail first end 22 of the frame rail (18a, 18b) provides for an acute angle (α) 40 between the first body side 34 and the second body side 36. The frame rail first end 24 of the frame rail (18a, 18b) provides for an obtuse angle (β) 44 between the first body side 34 and the second body side 36. The frame rails (18a, 18b) are at least one of connected and supported by a number of longitudinally spaced cross braces 46.

Figure 4B:
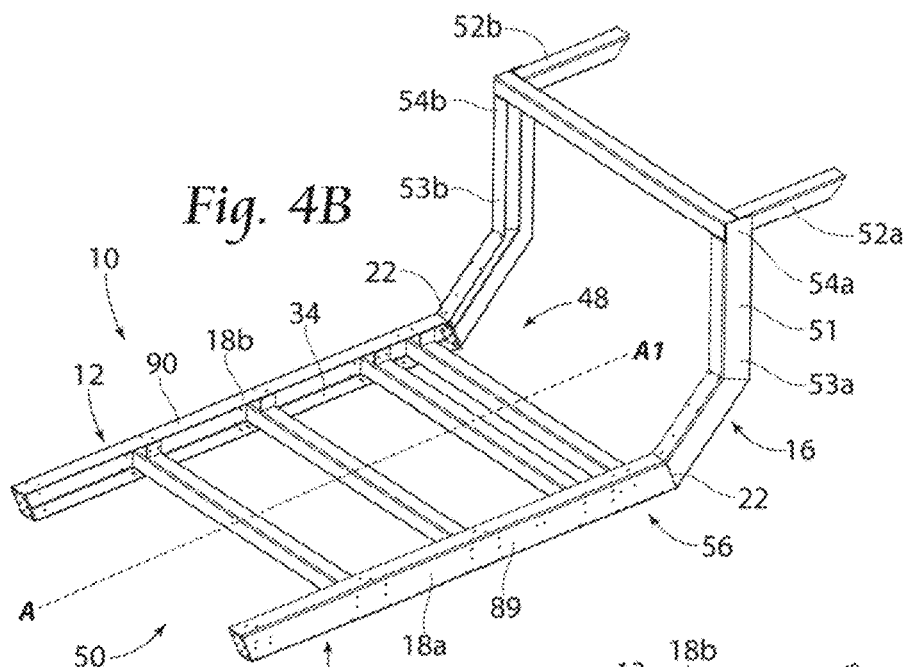
FIG. 4B is a perspective view of the modular carriage frame of the self-propelled boat launch vehicle of the present invention in communication with a front frame unit of the self-propelled boat launch vehicle of the present invention.

As illustrated in FIG. 4B, a frame 14 for the first embodiment of the self-propelled boat launch 10 is illustrated. The frame 14 for the first embodiment of the self-propelled boat launch 10 comprises a front frame unit 16 in communication with a first embodiment of the modular carriage frame section 56. The front frame unit 16 comprises an extension frame section 51 in connection with an engine support frame section (52a, 52b). The extension frame section 51 comprises two extension arms (53a, 53b). The front frame unit 16 is connected to the first embodiment of the modular carriage frame section 56 at the modular carriage frame first end 48. Specifically, extension arm 53a is in connection with the frame rail first end 22 of the frame rail 16a, and extension arm 53b is in connection with the frame rail first end 22 of the frame rail 18b. The extension arms (53a, 53b) extend opposite the first body side 34, and provide for a raised platform to ensure the engine remains out of the water when the self-propelled boat launch 2 is deployed. The engine support frame section (52a, 52b) is in connection with the extension arms (53a, 53b) to provide the raised platform to ensure the engine remains out of the water when the self-propelled boat launch 2 is deployed. Specifically, the engine support frame section (52a, 52b) is in connection with the extension arms (53a, 53b) at an extension arm location (54a, 54b), wherein in the extension arm location (54a, 54b) is positioned at a height above the first embodiment of the modular carriage frame section 56. It is noted that each extensions arms (53a, 53b) is formed having hollow interior (not illustrated in the figures). It is observed at least one element of the interrelationship between the extension frame section 51 and the first embodiment of the modular carriage frame section 56 is applied to at least one element of the interrelationship between the extension frame section 51 and a second embodiment of the modular carriage frame section 56', reference FIGS. 4B and 4C. Wherein the second embodiment of the modular carriage frame section 56' employs two modular carriage frames 12, reference FIGS. 4b and 4C. It is observed at least ore element of the interrelationship between the extension frame section 51 and the first embodiment of the modular carriage frame section 56 is applied to at least one element of the interrelationship between the extension frame section 51 and a third embodiment of the modular carriage frame section 56", reference FIGS. 4B and 4E. Wherein the third embodiment of the modular carriage frame section 56" employs three modular carriage frames 12, reference FIGS. 4B and 4E. It is observed the modular carriage frame section 56 may employ more than three modular carriage frames 12, reference FIG. 4B.

Figure 4C:
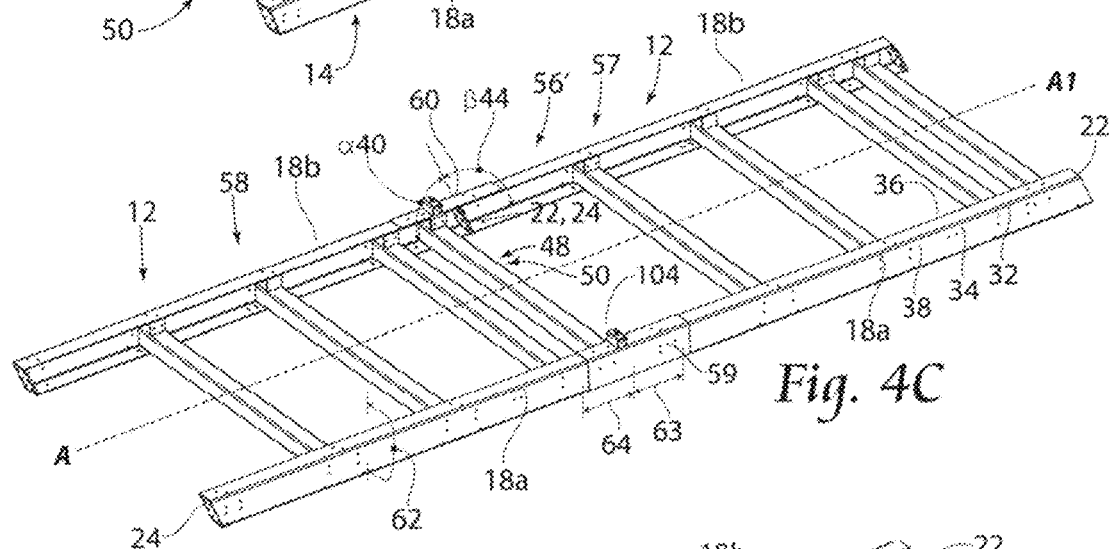
FIG. 4C is a perspective view of two modular carriage frames of the self-propelled boat launch vehicle of the present invention in communication with connection brackets.
Figure 5:
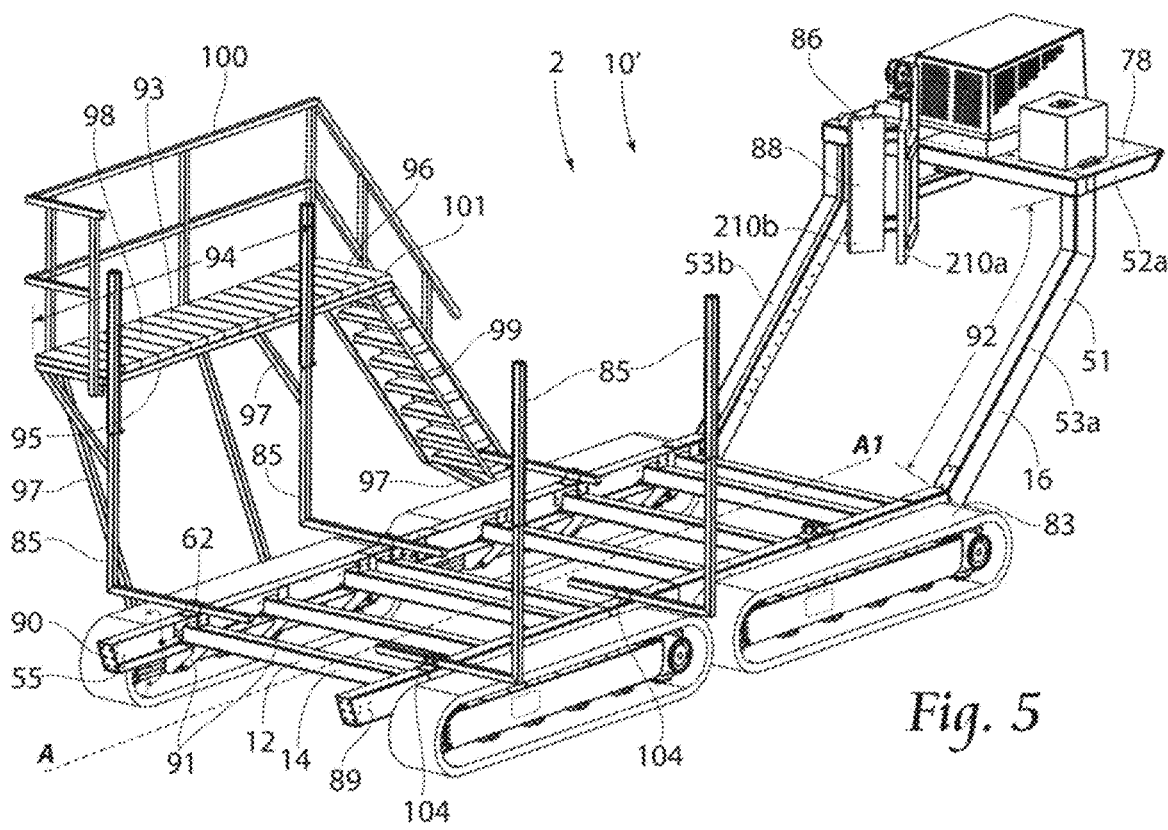
FIG. 5 is a perspective view of a second embodiment of a self-propelled boat launch vehicle of the present invention.

As illustrated in FIG. 4C, the second embodiment of the modular carriage frame section 56' of a frame 14 for a second embodiment of the self-propelled boat launch 10', reference FIG. 5, is illustrated. The second embodiment of the modular carriage frame section 56' comprises a first modular carriage frame 57 in connection with a second modular carriage frame 58. Wherein the modular carriage frame first end 48 of the second modular carriage frame 58 abuts to the modular carriage frame second end 50 of the first modular carriage frame 57 at a modular carriage frame connection 60. The modular carriage frame connection 60 comprises the frame rail first ends 22 of the frame rails (18a, 18b) of the second modular carriage frame 58 abutting to the frame rail second ends 24 of the frame rails (18a, 18b) of the first modular carriage frame 57, wherein the acute angle (α) 40 of the frame rail first end 22 of the frame rails (18a, 18b) of the second modular carriage frame 58 are supplemental to the obtuse angle (β) 44 the frame rail second end 24 of the frame rail (18a, 18b) of the first modular carriage frame 57, providing for at least substantially a 180 degree angle.

As illustrated in FIG. 4C, a connection bracket 59 provides for connecting the first modular carriage frame 57 in connection with the second modular carriage frame 58. The connection bracket 59 is at least one of hollow or substantially hollow. The connection bracket 59 extends about the modular carriage frame connection 60. With respect to each connection bracket 59, the connection bracket 59 further extends a first predetermined distance 63 onto the frame rail (18a, 18b) of the first modular carriage frame 57, and the connection bracket 59 further extends a second predetermined distance 64 onto the frame rail (18a, 18b) of the second modular carriage frame 58. The connection bracket 59 is in extended communication about a frame rail outer perimeter 62 frame rail (18a, 18b) of the first modular carriage frame 57 and a frame rail outer perimeter 62 of the frame rail (18a, 18b) of the second modular carriage frame 58. The frame rail outer perimeter 62 is defined by the frame rail body 32, comprising the first body side 34, the oppositely opposed second body side 36, and the body side plate 38. Specifically, the connection bracket 59 is in extended fixed and removable communication about a frame rail outer perimeter 62 frame rail (18a, 18b) of the first modular carriage frame 57 and a frame rail outer perimeter 62 of the frame rail (18a, 18b) of the second modular carriage frame 58. The fixed and removable communication is preferably through a thread communication between at least one nut and at least one bolt. Alternatively, the connection bracket 59 is in extended fixed communication about a frame rail outer perimeter 62 frame rail (18a, 18b) of the first modular carriage frame 57 and a frame rail outer perimeter 62 of the frame rail (18a, 18b) of the second modular carriage frame 58, through the use of at least one of rivets and welding. The connection bracket 59 provides for a mounting bracket 104 for mounting of guide bars in the use of the self-propelled boat launch vehicle 2.

Figure 4D:
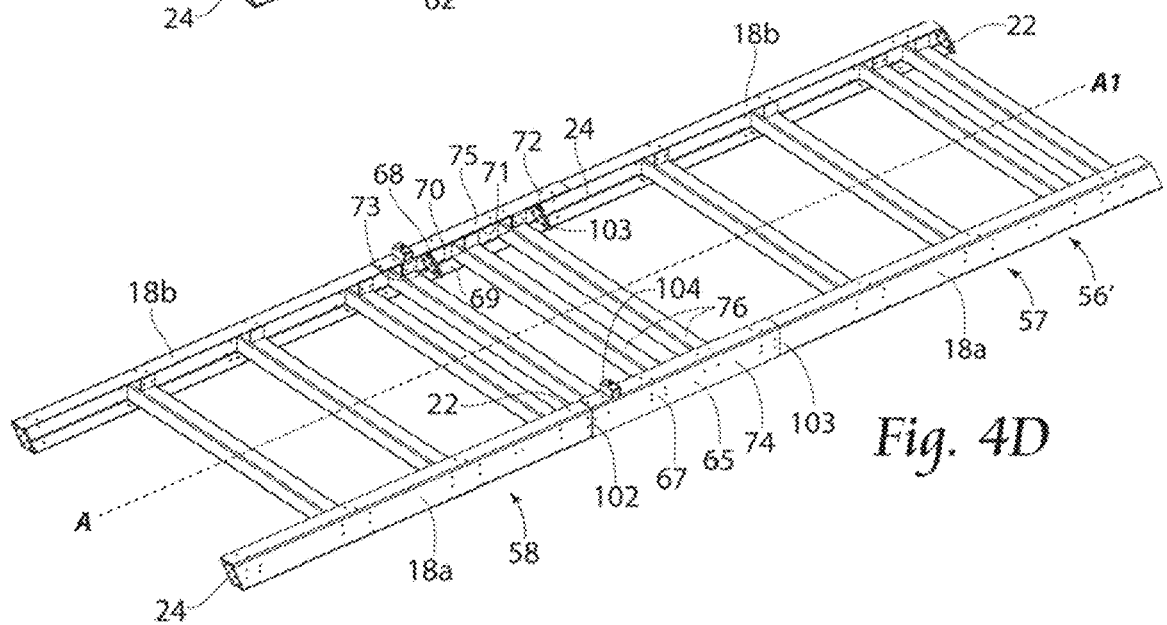
FIG. 4D is a perspective view of two modular carriage frames of the self-propelled boat launch vehicle of the present invention in communication with extension brackets.

As illustrated in FIG. 4D, the second embodiment of the modular carriage frame section 56' of a frame 14 for a second embodiment of the self-propelled boat launch 10', reference FIG. 5, is illustrated, wherein the frame rail (18a, 18b) of the first modular carriage frame 57 and the frame rail (18a, 18b) of the second modular carriage frame 58 are fixed communication through an extension bracket 65. The extension bracket 65 comprises a first extension bracket sleeve 67 and an oppositely opposed, about the long center axis A-A1 second extension bracket sleeve 68. Wherein the first extension bracket sleeve 67 and the second extension bracket sleeve 68 extend parallel to the long center axis A-A1. Each extension bracket sleeve (67, 68) is at least one of hollow or substantially hollow, and provides for an extension sleeve cavity 69. The extension sleeve cavity 69 providing for an extension rail 70 in communication with an extension sleeve inner perimeter 71, wherein the extension rail 70 extends substantially parallel to the long center axis A-A1. The extension rail 70 having an extension rail first end 72 and an oppositely opposed extension rail second end 73, wherein preferably both of the extension rail first end 72 and the extension rail second end 73 are contained within the extension sleeve cavity 69. Alternatively, at least one of the extension rail first end 72 and the extension rail second end 73 is contained within the extension sleeve cavity 69. The first extension bracket sleeve 67 and extension rail 70 combination form a first extension assembly 74. The second extension bracket sleeve 68 and extension rail 70 combination form a second extension assembly 73. The first extension bracket sleeve 67 and the second extension bracket sleeve 68 are at least one of connected and supported by a number of longitudinally spaced extension cross braces 76.

Figure 4E:
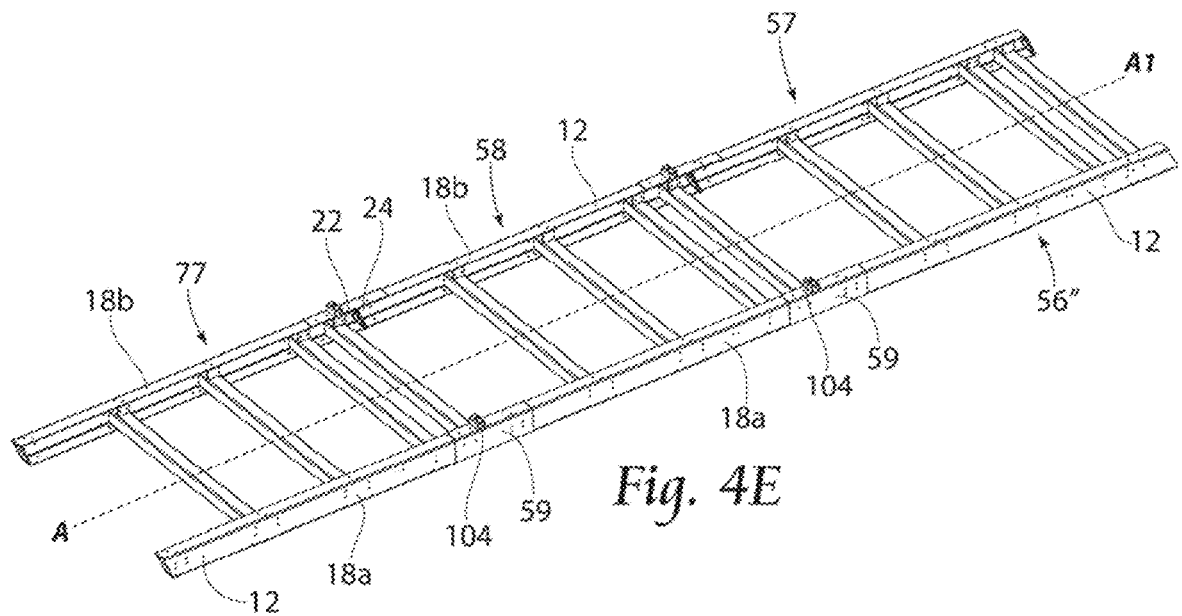
FIG. 4E is a perspective view of three modular carriage frames of the self-propelled boat launch vehicle of the present invention in communication with connection brackets.
Figure 17:
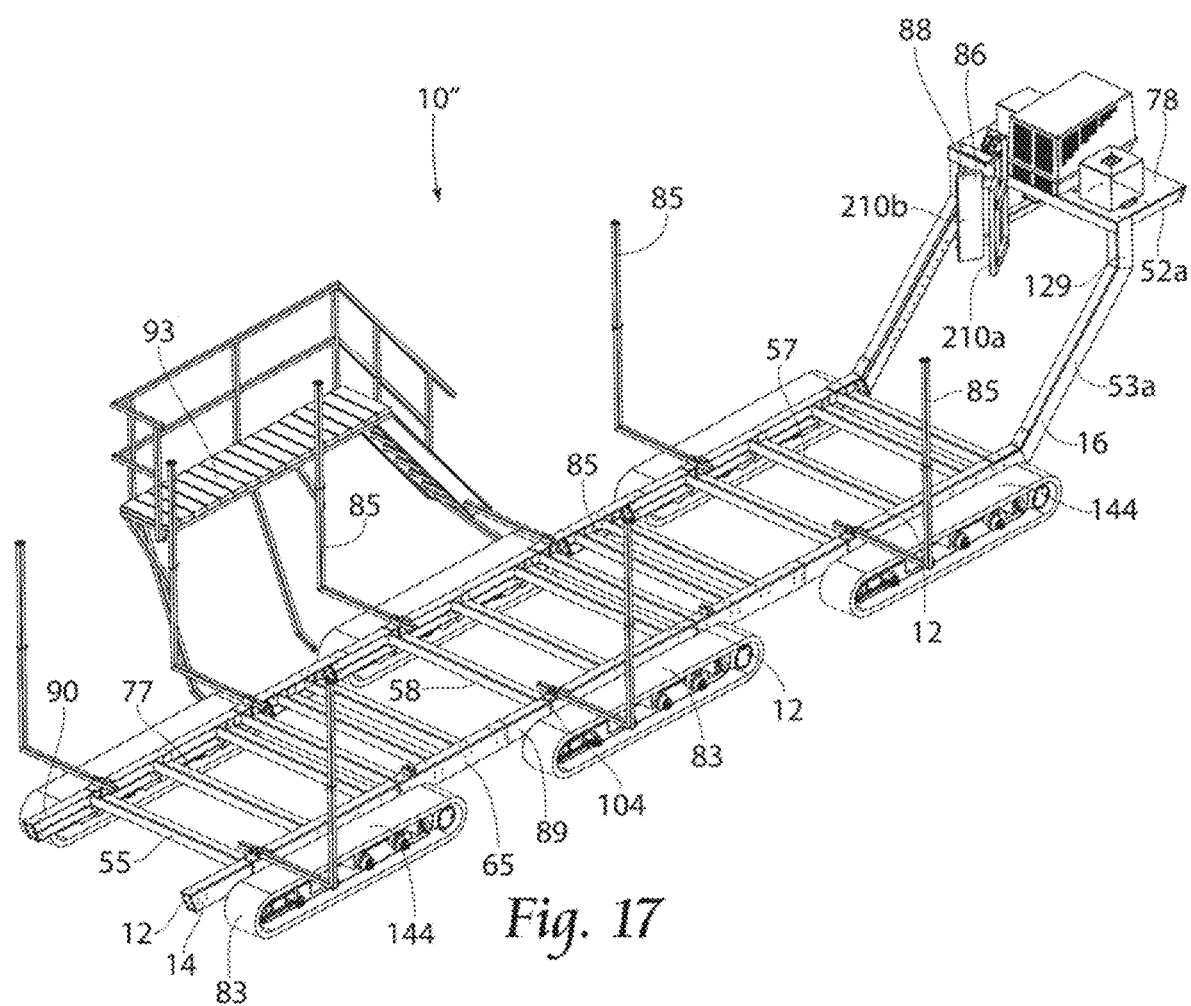
FIG. 17 a perspective view of the third embodiment of the self-propelled boat launch vehicle of the present invention.

The extension bracket 65 provides for fixed and removable communication with the frame rail (18a, 18b) of the first modular carriage frame 57 and the frame rail (18a, 18b) of the second modular carriage frame 58 in the following manner. An extension sleeve first end 103 of the extension assembly (74, 75) receives the frame rail second end 24 of the frame rail (18a, 18b) of the first modular carriage frame 57. This relationship applies for both the first extension assembly 74 and the second extension assembly 75. For each combination extension assembly (74, 75) and the frame rail (18a, 18b), the extension rail first end 72 abuts to the frame rail second end 24 and are in supplemental communication with one another to provide for a substantially 180 degree orientation. The extension sleeve first end 103 is in fixed and removable communication with the frame rail (18a, 18b), through the use of a threaded combination between at least one nut and at least one bolt. Alternatively, the extension sleeve first end 103 is in fixed communication with the frame rail (18a, 18b), through the use of at least one of rivets and welding. An extension sleeve second end 102 of the extension assembly (74, 75) receives the frame rail first end 22 of the frame rail (18a, 18b) of the second modular carriage frame 58. This relationship applies for both the first extension assembly 74 and the second extension assembly 75. For each combination extension assembly (74, 75) and the frame rail (18a, 18b), the extension rail second end 73 abuts to the frame rail first end 22 and are in supplemental communication with one another to provide for a substantially 180 degree orientation. The extension sleeve second end 102 is in fixed and removable communication with the frame rail (18a, 18b), through the use of a threaded combination between at least one nut and at least one bolt. Alternatively, the extension sleeve first end 103 as in fixed communication with the frame rail (18a, 18b), through the use of at least one of rivets and welding. At least one of the first extension assembly 74 and the second extension assembly 75 provides for a mounting bracket 104 for mounting of guide bars in the use of the self-propelled boat launch vehicle 2. It is observed As illustrated in FIG. 4E, the third embodiment of the modular carriage frame section 56" of a frame 14 for a third embodiment of the self-propelled boat launch 10", reference FIG. 17, is illustrated. The third embodiment of the modular carriage frame section 56" comprises the first modular carriage frame 57 in communication with the second modular carriage frame 58, as previously described. The third embodiment of the modular carriage frame section 56" further comprises the second modular carriage frame 58 in communication with a third modular carriage frame 77. Communication of the second modular carriage frame 58 in and the third modular carriage frame 77 is provided for with the frame rail first ends 22 of the frame rails (18a, 18b) of the third modular carriage frame 77 in communication with the frame rail second ends 24 of the frame rails (18a, 18b) of the second modular carriage frame 58. It is observed in FIG. 4E that communication between the third modular carriage frame 77 and the second modular carriage frame 58 maybe accomplished with connection brackets 59, and this connection is provided for as previously described. It is further observed the connection between the third modular carriage frame 77 and the second modular carriage frame 58 maybe accomplished with extension brackets 65, reference FIG. 4D, and this connection is provided for as previously described. It is observed more than three modular carriage frames 12 may be employed for extended length of the self-propelled boat launch vehicle 2.

It is observed the extension brackets 65 provide for an intended benefit of this invention which is a construction allowing for extensions to be applied to address boats and small watercraft of various sizes.

It is observed the modular carriage frames 12 provide for an intended benefit of this invention which is a modular carriage frame construction to allow for multiple models of different sites to be produced with the same components.

With attention to FIGS. 1 to 3, a boat crib or bunk 79 is illustrated. Each modular carriage frame 12 having at least one boat crib or bunk 79. The boat crib or bunk 79 is in secured communication with frame rail (18a, 18b), reference FIGS. 1 and 3, at least one bunk support location 80, preferably three bunk support locations 80, along the frame rail (18a, 18b). The bunk support location 80 is preferably a fixed communication between the boat crib or bunk 79 and the frame rail (18a, 18b). Alternatively, the bunk support location 80 may be a removable communication between the boat crib or bunk 79 and the frame rail (18a, 18b). At least one bunk support member 81 provides the at least one of a fixed communication and a removable communication between the boat crib or bunk 79 and the frame rail (18a, 18b) at the bunk support location 80.

The boat crib or bunk 79 varies in number and orientation for a particular self-propelled boat launch 2 depending on the types of boats or small watercrafts to be transported on the self-propelled boat launch 2. As illustrated in FIGS. 1 to 3, the boat crib or bunk 79 may consist of a pair of crib rails 82, reference FIG. 1, in at least one of fixed and removable communication with at least one bunk support member 81. The crib rails 82 are preferably neoprene covered aluminum. Alternatively, the crib rails 82 may comprise a polymer. Alternatively, the crib rails 82 may comprise a fibrous material. Alternatively, the crib rails 82 may comprise at least one of rubber rollers and neoprene rollers. Alternatively, the crib rails 82 may comprise a carpet material.

As seen best in FIGS. 1 to 3, the rails 82 extend a marginal distance above the frame rail (18a, 18b) and have a height and a spacing selected to engagedly support the bottom side portions of the boat hull (not illustrated in the figures), so that the boat (not illustrated in the figures) may be trailered thereon without interfering with the rotation of track assemblies 83, to be discussed. The height, of the rails 82 is also selected so as to assume a submerged position during boat launching and docking, so as not to interfere with the free movement of the boat onto and off of the boat bunk 79. The rails 82 are spaced apart from each other so as to maintain the boat (not illustrated in the figures) in a position mounted on the frame rail (18a, 18b), the modular carriage frame 12, during boat transport while not interfering with the boat propeller (not shown) during boat launching and/or docking. When the rear end 84 of the self-propelled boat launch 2 is submerged into the water, the boat 12 will float freely above the bunk rails 82.

Figure 16A:
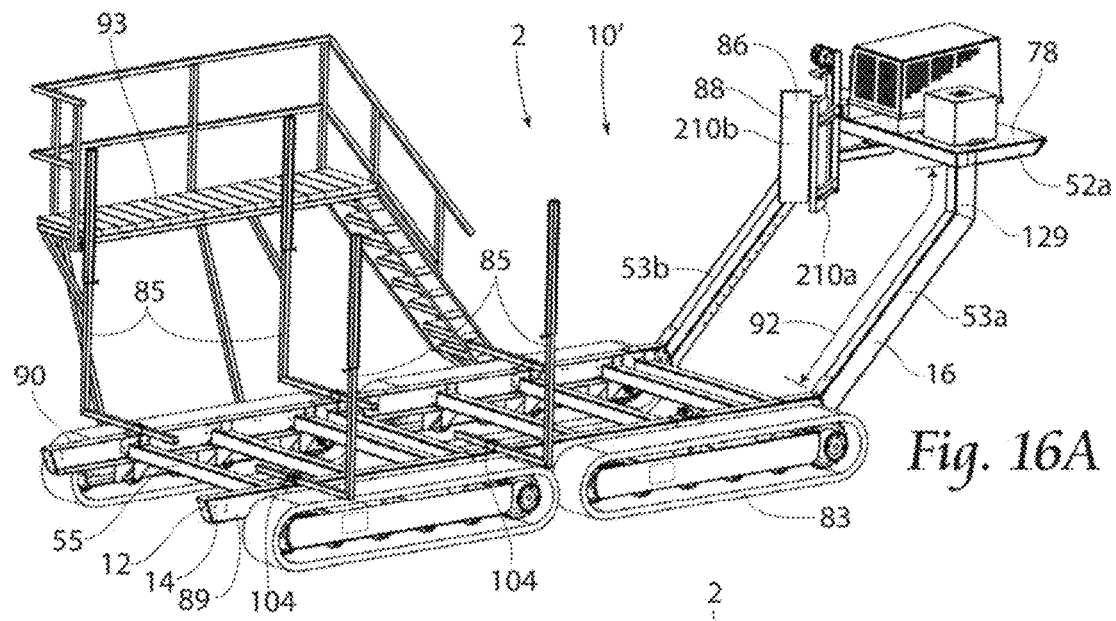
FIG. 16A a perspective view of the second embodiment of the self-propelled boat launch vehicle of the present invention.
Figure 16B:
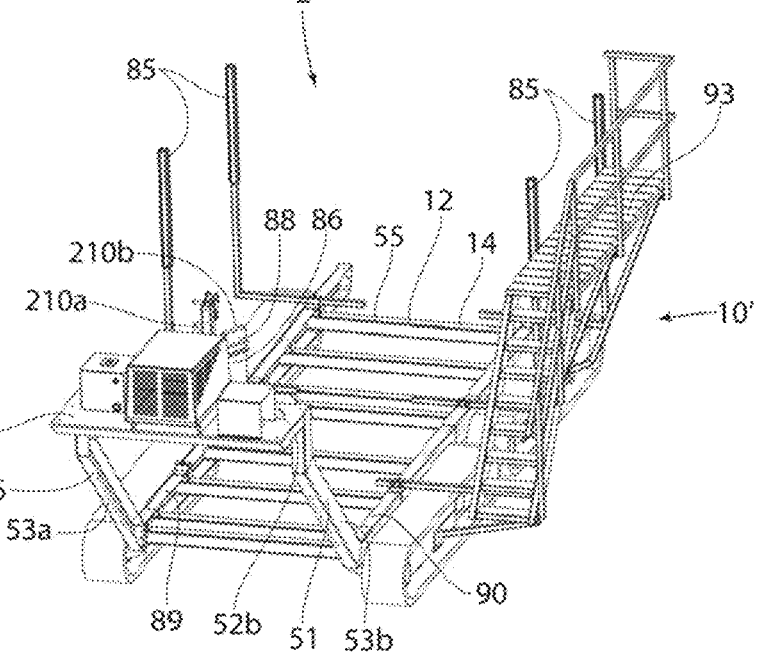
FIG. 16B a perspective view of the second embodiment of the self-propelled boat launch vehicle of the present invention.

As illustrated in FIGS. 5, 18A and 16B, illustrating the second embodiment of the self-propelled boat launch 10', the rails 82 (not illustrated in the respective figures, reference FIG. 1) may be at least one of removed and replaced with other features in order to accommodate various sizes and shapes of boat hulls and small watercraft hulls. Other features may include rollers as previous described and guide bars 85 and other features known in the industry.

As illustrated in FIGS. 1, 2, 5, 16A and 16B, various front attachments 86. In FIGS. 1 and 2, a front attachment first, embodiment 87 is provided, therein the front attachment first embodiment 87 is attached to at least one extension arm (53a, 53b) of the front frame unit 16. The front attachment first embodiment 87 providing for a design which accommodates the boat or watercraft to be transported. In FIGS. 5, 16A and 16B, a front attachment second embodiment 88 is provided. Wherein the front attachment second embodiment 88 is attached to at least one of the engine assembly 78 and at least one of the extension arms (52a, 52b). Alternatively, the front attachment second embodiment 88 may be attached to at least, one of the engine assembly 78 and at least one of the extension arms (52a, 52b) and at least one extension arm (53a, 53b) of the front frame unit 16. The front attachment second embodiment 88 providing for a design of two panels (210a, 210b) angled to accommodate a front of a boat hull, or a front of a watercraft hull, to be transported. Alternatively, the engine assembly 78 may be mounted along at least one of a modular first side 89 and a modular carriage frame second side 90 of at least one modular carriage frame 12, (not illustrated in the figures).

As illustrated in FIGS. 1, 2 to 5, at least one track assembly 83 is in removable communication with the frame rail outer perimeter 62 of the frame rail (18a, 18b). Wherein at least one track assembly 83 is in removable communication with the modular carriage frame first side 89. Wherein at least one track assembly 83 is in removable communication with the modular carriage frame second side 90. The track assembly is removably attached to the frame rail (18a, 18b) by at least one track mounting bracket 91.

As illustrated in FIGS. 2, 5 and 16A, the front frame unit may be of varying dimensions. Specifically, an extension arm length 92 of the extensions arms (53a, 53b) may vary between different self-propelled boat launch 2. The extension arm length 92 is selected to enable the boat bunk 79 to be sufficiently submerged to permit the boat to be floated free from the self-propelled boat launch 2 during boat launching or docking while maintaining the engine assembly 78 above the water. It is to be appreciated that by positioning the engine assembly 78 on the extensions arms (53a, 53b), the modular carriage frame section 55 of the frame 14 and boat bunk 79 may be lowered into the water and submerged sufficiently to enable the boat to float free thereof, while maintaining the engine assembly 78 above the water.

As illustrated in FIGS. 5, 16A and 16B, a walkway 93 is provide on the second embodiment of the self-propelled boat launch 10'. It is observed the walkway 93 is provide on the third embodiment of the self-propelled boat launch 10", reference FIG. 17. The walkway 93 fixed to the frame 14. The walkway having a walkway length 94 extending at least substantially parallel to the long center axis A-A1. Wherein the walkway 93 may fee extended to further accommodate at least one of the third embodiment of the self-propelled boat launch 10" and self-propelled boat launch 2 comprising more than three modular carriage frames 12. The walkway 93 comprising a walkway horizontal frame 95 extending at least substantially the walkway length 94. The walkway having a walkway surface 96 extending at least substantially the walkway length 94, The walkway surface 96 has a lateral width selected to enable a user to comfortably walk thereon when entering and exiting from the boat. In this regard, the walkway 93 has a lateral width of at least one foot and more preferably between about 2 and 6 feet. The walkway 93 preferably extending generally horizontally along at least one of the modular carriage frame first side 89 and the modular carriage frame second side 90. It is to be appreciated that the walkway 93 is positioned so as to not interfere with the movement of the boat to and from a position over the boat bunk 79, not illustrated in the referenced figures, reference FIG. 1. The walkway is in secured communication with at least one of the frame 14, track assembly 83 and guide bars 85 thru at least one walkway support 97.

The walkway surface 96 consists of at least, one walkway decking 98 which may, for example, be made from aluminum, galvanized steel, plastic or other suitable material. The walkway decking 98 is positioned at least one of substantially perpendicular to the long center axis A-A1 and parallel to the long center axis A-A1.

A staircase/ladder 99 extends from a walkway first end 101 to provide for access to the walkway. The staircase/ladder is further fixed to the at least one of the frame 14, track assembly 83 and guide bars 85 thru at least one walkway support 97. The walkway surface 98 and staircase/ladder 99 are bordered by a walkway rail 100 wherein the walkway surface 98 and staircase/ladder 99 is at least substantially positioned between the frame 14 and the walkway rail 100.

As illustrated in FIGS. 5, 16A and 16B, the guide bars are removably secured to the frame 14 thru the mounting bracket 104. The guide bars extend vertically to provide for a guide in maneuvering a boat into position. The guide bars may be telescoping to provide for varying sixes of boats.

Figure 6A:
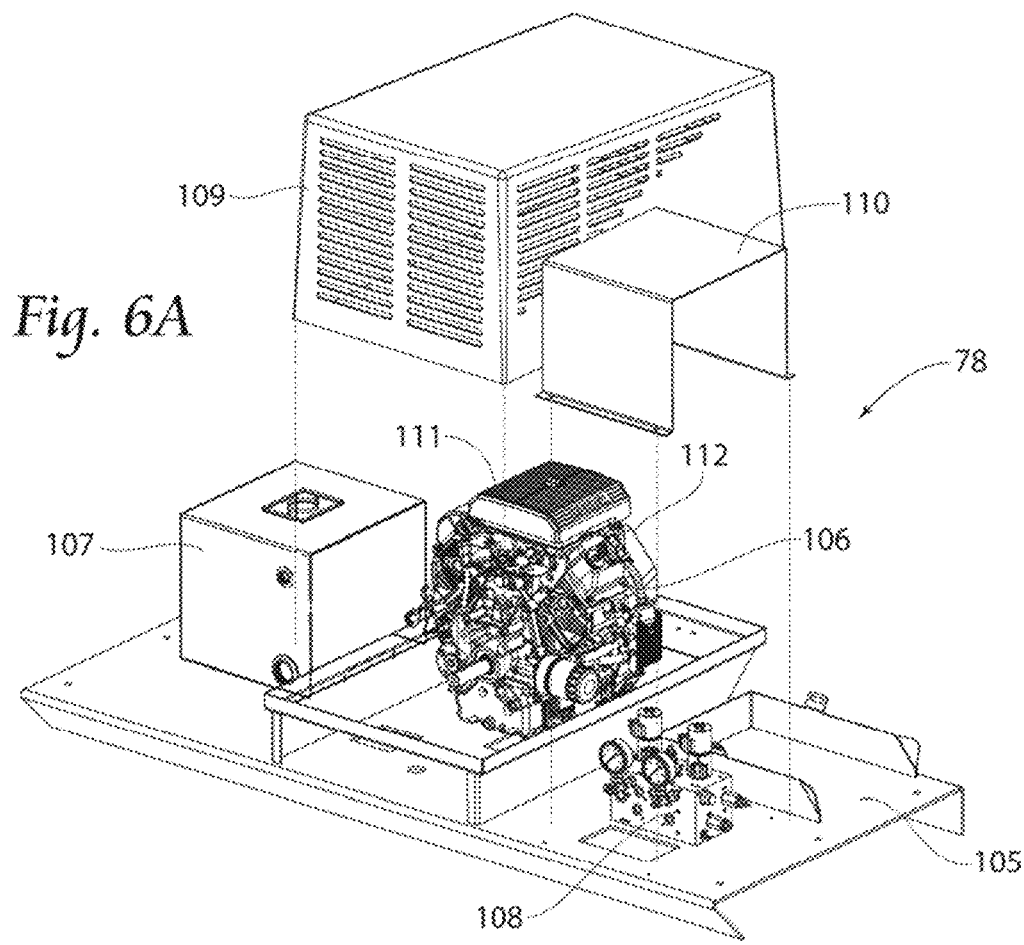
FIG. 6A is an exploded perspective view of an engine assembly of the self-propelled boat launch vehicle of the present invention.
Figure 6B:
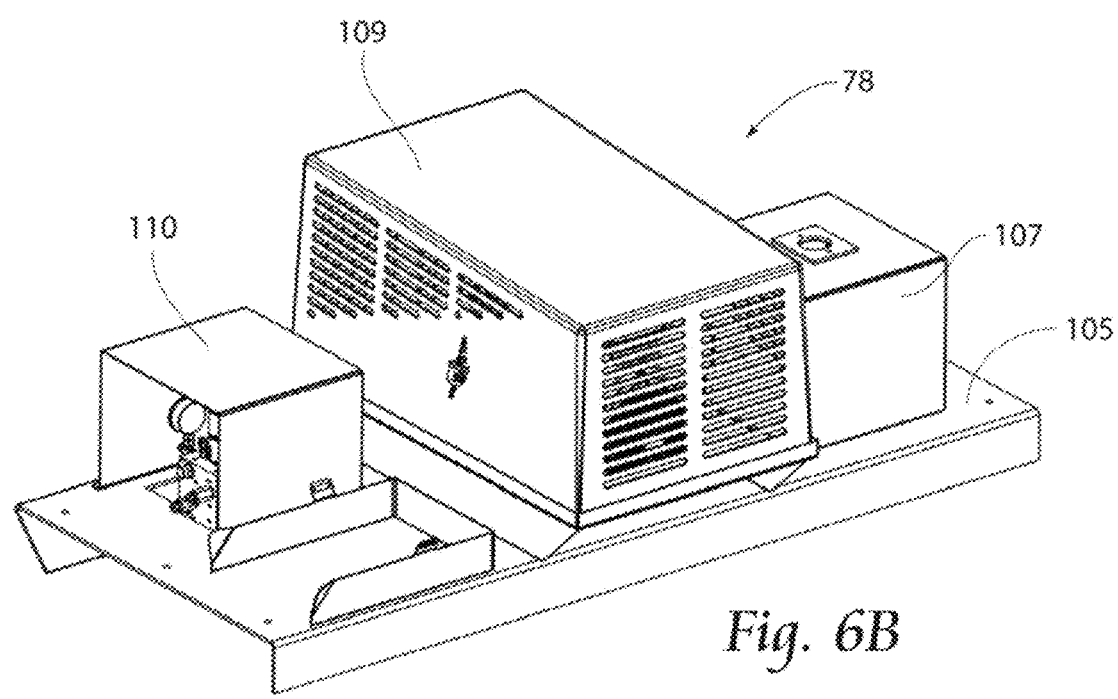
FIG. 6B is a perspective view of the engine assembly of the self-propelled boat launch vehicle of the present invention.

With attention to FIGS. 6A and 6B, the engine assembly 78 is illustrated. The engine assembly comprises an engine assembly base plate 105. The engine assembly base plate supports at least one of the engine/pump combination 106, the hydraulic tank 107 and the manifold 108. The self-propelled boat launch 2 not illustrated in the referenced figures, is adapted for self-propulsion by means of the engine assembly 78. The engine/pump combination 106 comprises an engine 111 which operates the associated hydraulic pump 112. Alternatively, the engine 112 and the hydraulic pump 112 may be separate units. Wherein the engine 111 is at least one of a diesel engine, and electric engine, and a solar engine. It is observed the diesel engine is preferred. Tire hydraulic pump 112 provides a force to move the oil housed in the hydraulic tank 107, and further in the hydraulic system 114 (illustrated in FIG. 7). The hydraulic oil is sent to the manifold 108 where in the manifold distributes the hydraulic oil thru the hydraulic system 114. An engine cover 109 provides protection to the engine/pump combination 106. A manifold cover 110 provides protection to the manifold 108.

With attention to FIGS. 6A, 7 10, 11, 12, and 15, the hydraulic system of the self-propelled boat launch is further described. As illustrated in FIG. 1, the propulsion of the self-propelled boat launch 2 is provided by the hydraulic system 114, wherein the hydraulic system 114 provides hydraulic power to at least one hydraulic motor 115 (reference FIG. 12A) in at least one of the track assemblies 83. At least one of the hydraulic tank 107 and the hydraulic pump 112 is fluidly connected to the manifold 108, wherein hydraulic fluid is transferred to the manifold 108. The manifold 108 provides for distribution of the hydraulic fluid in a manner dependent upon commands received by the remote control 116 (referenced FIGS. 8 and 9).

Figure 10:
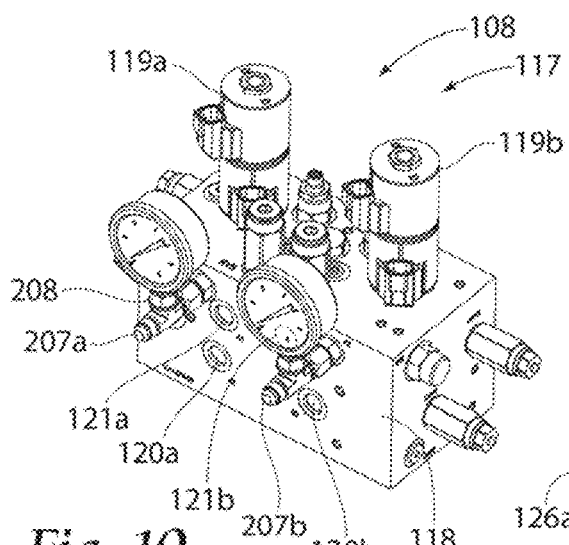
FIG. 10 is a perspective view of a first embodiment of a hydraulic manifold of the self-propelled boat launch vehicle of the present invention.
Figure 11:
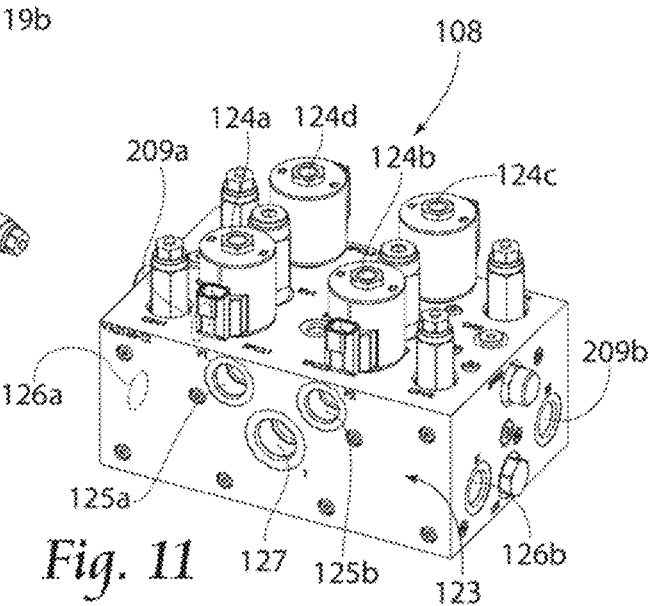
FIG. 11 is a perspective view of a second embodiment of the hydraulic manifold of the self-propelled boat launch vehicle of the present invention.

As illustrated in FIGS. 10 and 11, two embodiments of the manifold 108 are described, with further reference to FIGS. 1, 6A, and 12. As illustrated in FIG. 10, a manifold first embodiment 117 comprises a first manifold block 118. The first manifold block 118 providing for controlling hydraulic propulsion to a first embodiment of the self-propelled boat launch 10. Wherein the first manifold block 118 provides for independently controlling the track assembly 83 on the modular carriage frame first side 89 and the first manifold block 118 provides for independently controlling the track assembly 83 on the modular carriage frame second side 90. For controlling each of the track assembly 83 on the modular carriage frame first side 89 and the track assembly on the modular carriage frame second side 90, the first manifold block 118 provides for a solenoid (119a, 119b), a first direction port (121a, 121b) for directing the hydraulic motor 115 to advance in a first direction, a second direction port (120a, 120b) for directing the hydraulic motor 115 to advance in a second direction, and a manifold first embodiment inlet port (207a, 207b) for receiving hydraulic oil from at least one of the hydraulic tank 107 and the hydraulic, pump 112. The solenoid (119a, 119b) controls the flow of hydraulic oil thru the manifold block 118. A manifold first embodiment return port 208 provides for returning hydraulic oil to the Hydraulic tank 107.

As illustrated in FIG. 11, a manifold second embodiment 122 comprises a second manifold block 123, with further reference to FIGS. 6A, 12A, 16A and 17. The second manifold block 123 providing for controlling hydraulic propulsion to at least one of the second embodiment of the self-propelled boat launch 10' and the third embodiment of the self-propelled boat launch 10". Wherein the second manifold block 123 provides for independently controlling the track assembly 83 on the modular carriage frame first side 89 for each modular carriage frame 12, and the second manifold block 123 provides for independently controlling the track assembly 83 on the modular carriage frame second side 90 for each modular carriage frame 12. For controlling each of the track assembly 83 on the modular carriage frame first side 89 of each modular carriage frame 12 and the track assembly on the modular carriage frame second side 90 of each modular carriage frame 12, the second manifold block 123 provides for a solenoid for each side (89, 90) of each modular carriage frame 12 (124a, 124b, 124c, 124d), an manifold second embodiment inlet port (125a, 125b) for receiving hydraulic oil from at least one of the hydraulic tank 107 and the hydraulic pump 112, a manifold second embodiment first direction port (126a, 126b) for directing the hydraulic motor 115 to advance in a first direction, a manifold second embodiment second direction port (209a, 209b) for directing the hydraulic meter 115 to advance in a second direction. A manifold second embodiment return pert 127 provides for returning hydraulic oil to the hydraulic tank 107. The solenoid (124a, 124b, 124c, 124d) controls the flow of hydraulic oil thru the manifold block 123 to each of the sides (89, 90) of each modular carriage frame 12.

Figure 15:
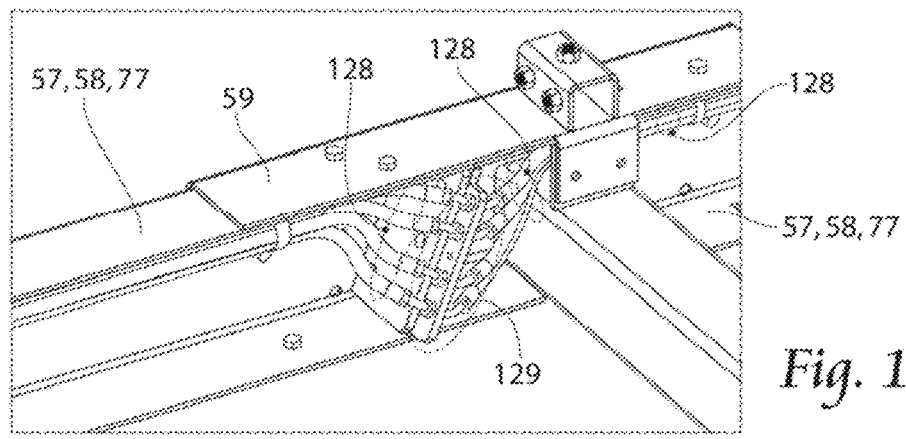
FIG. 15 is a close up of hydraulic line connections where the modular carriage frame communicates with at least one of the connection bracket, and the extension bracket.

As illustrated in FIG. 15, with reference to FIGS. 6A, 10, 11, 12A and 16A, the hydraulic lines 128 provide for fluidly connecting the hydraulic tank 107, hydraulic pump 112, the manifold (108, 117, 123), and the hydraulic motors 115. This connection provides for locomotion of the self-propelled boat launch 2. The hydraulic lines 128 may travel on an extension arm exterior 129 (reference FIG. 16A) of the extension arms (53a, 53b). Preferably, the hydraulic lines 128 are removably located within the hollow interior (not illustrated in the figures) of the extension arms (53a, 53b). As illustrated FIG. 15, illustrates the connection of at least one of the first modular carriage frame 57, the second modular carriage frame 58 and the third modular carriage frame 77 to at least one of the first modular carriage frame 57, the second modular carriage frame 58 and the third modular carriage frame 77 as assisted by a connection bracket 59. It is observed hydraulic fittings 129 provide for connection of hydraulic lines 128 in the respective at least one of the first modular carriage frame 57, the second modular carriage frame 58 and the third modular carriage frame 77 to the hydraulic lines 128 in the connecting at least one of the first modular carriage frame 57, the second modular carriage frame 58 and the third modular carriage frame 77. The hydraulic fittings 129 provide for removable connection of the hydraulic lines 128.

It is observed the hydraulic fittings 129 are applied, and provide for removable connection of the hydraulic lines 128, when extension brackets 65 are applied to connect at least one of the first modular carriage frame 57, the second modular carriage frame 58 and the third modular carriage frame 77 to a connecting at least one of the first modular carriage frame 57, the second modular carriage frame 58 and the third modular carriage frame 77. It is further observed the extension bracket 65, not illustrated in the Figure, may provide for at least one hydraulic tubing 128 and at least one hydraulic fitting 129 to provide for removable connection between the respective modular carriage frames (57, 58, 77).

It is further provided that at least one hydraulic fitting 129 provides for removable connection of the hydraulic lines 128 of the extension arms (53a, 53b) and the hydraulic lines of at least one of the first modular carriage frame 57, the second modular carriage frame 58 and the third modular carriage frame 77 in a manner at least substantially similar to that illustrated in FIG. 15.

Figure 7:
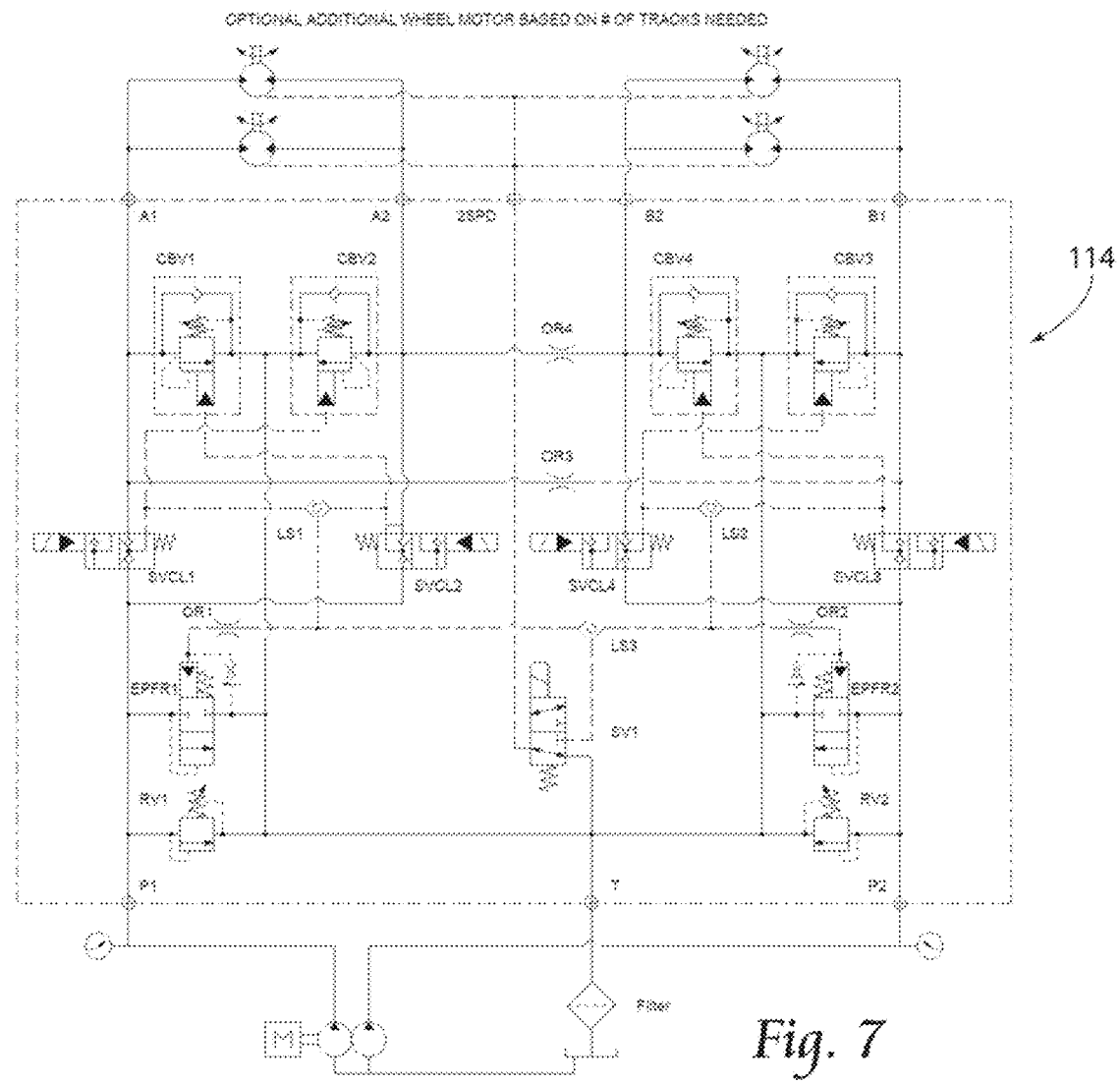
FIG. 7 is a schematic of a hydraulic system of the self-propelled boat launch vehicle of the present invention.
Figure 8:
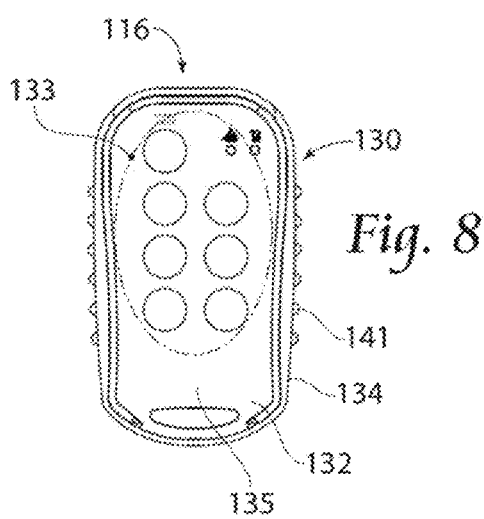
FIG. 8 is a front view of a first embodiment of a remote control for the self-propelled boat launch vehicle of the present invention.

With attention to FIGS. 7 and 8, the remote control 116 of the self-propelled boat launch 2 is further illustrated. The remote control 116 is provided in two embodiments, a control unit first embodiment 130 and a control unit second embodiment 131. As illustrated in FIG. 8, the control unit first embodiment 130 is described. The control unit first embodiment 130 provides for remote control of the first embodiment of the self-propelled boat launch 10, reference FIG. 1. The control unit first embodiment 130 comprises a control unit first embodiment body 132. The control unit first embodiment body 132 having a plurality of equally spaced ribs 141 about a control unit body perimeter 134. The control unit first embodiment body 132 having a plurality of buttons 133 about a control unit body face 133. Wherein the plurality of buttons 133 provide for controlling at least one of the direction and speed of the track assemblies 83 on at least one of the modular carriage frame first side 89 and the modular carriage frame second side 90, reference FIG. 1.

Figure 9:
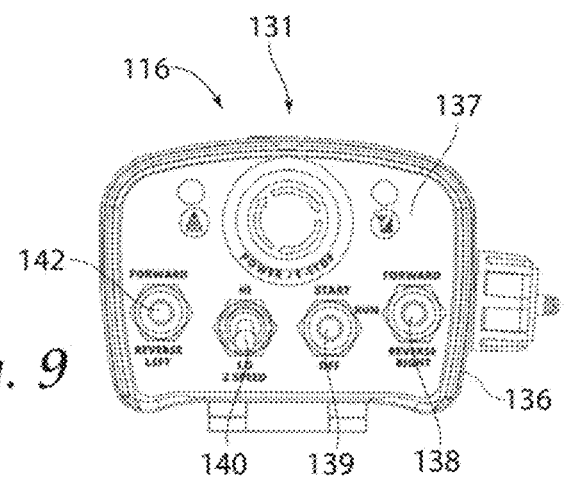
FIG. 9 is a front view of a second embodiment of the remote control for the self-propelled boat launch vehicle of the present invention.

As illustrated in FIG. 9, the control unit second embodiment 131, The control unit second embodiment 131 provides for remote control of at least one of the second embodiment of the self-propelled boat launch 10' and the third embodiment of the self-propelled boat launch 10", reference FIGS. 16A and 17. The control unit second embodiment 131 having a control unit second embodiment body 136. The body 136 providing for a control unit second embodiment face 137. The face 137 providing for a plurality of knobs (138, 139, 140, 142). A first knob 139 provides for turning the self-propelled boat launch 2 on and off. A second knob 140 for choosing between a first speed and a second speed of the self-propelled boat launch 2. A third knob 138 provides for movement of the track assemblies on the modular carriage frame first side 89 of the self-propelled boat launch (10', 10"). A fourth knob 142 provides for movement of the track assemblies on the modular carriage frame second side 90 of the self-propelled boat launch (10', 10").

With attention FIGS. 11A and 11B, the track assemblies 83 are further illustrated. The track assembly 83 comprises a continuous track 144 in movable communication about a track assembly body 143. The continuous track 144 comprising a continuous track outer circumference 156 which contacts the surface on which the self-propelled boat launch 2 operates, and a continuous track interior circumference 155. The track assembly body 143 comprises a drive sprocket assembly 145 at least in close proximity to a track assembly first end 146. The track assembly body 143 further comprises an idler wheel assembly 147 at least in close proximity to a track assembly second end 148. Wherein the track, assembly first end 146 and the track assembly second end 148 are oppositely opposed to one another along a track assembly length 149. Wherein the continuous track 144 moves about the track assembly body 143 along the track assembly length 143. The drive sprocket assembly comprises at least one drive sprocket 150 in rotational communication with the hydraulic motor 115 of the respective track assembly 83. Specifically, the hydraulic motor 115 residing in a drive sprocket through hole 158, wherein the drive sprocket through hole 158 is defined by a drive sprocket inner circumference 157. Such that the hydraulic motor 115 is in rotational communication with the drive sprocket inner circumference 157. The drive sprocket 150 in further rotational communication with the continuous track interior circumference 155, wherein the drive sprocket 150 rotates the continuous track 144. The idler wheel assembly 147 comprises an idler wheel 151 in slidable communication with a track tensioner 152. The track tensioner 152 in fixed communication with at least one of the track assembly body 143 and a track body shell 153. The idler wheel 151 in rotational communication with the continuous track interior circumference 155. The track assembly body 143 comprises the body shell 153 with at least one, preferably four, roller assemblies 154 in rotational communication with the body shell 153 along the track assembly length 149. Wherein the roller assemblies 154 are in rotational communication with the continuous track interior circumference 155.

Figure 12A:
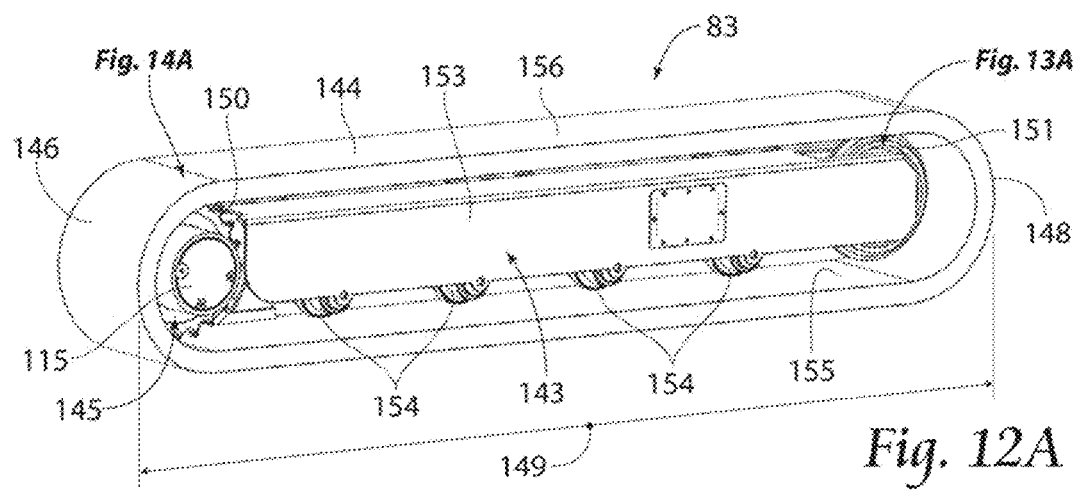
FIG. 12A is a perspective view of a track assembly of the self-propelled boat launch vehicle of the present invention.
Figure 12B:
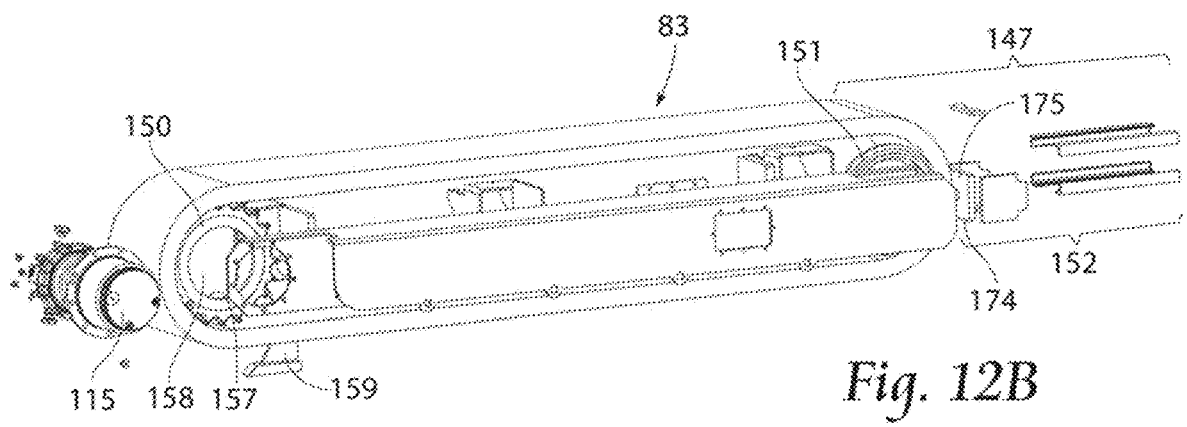
FIG. 12B is an exploded perspective view of the track assembly of the self-propelled boat launch vehicle of the present invention.

As illustrated in FIG. 12B, a track cleaner 159 is in close proximity to the drive sprocket assembly 145. Wherein the track cleaner 159 may be at least partially enclosed by the body shell 153.

Figure 13A:
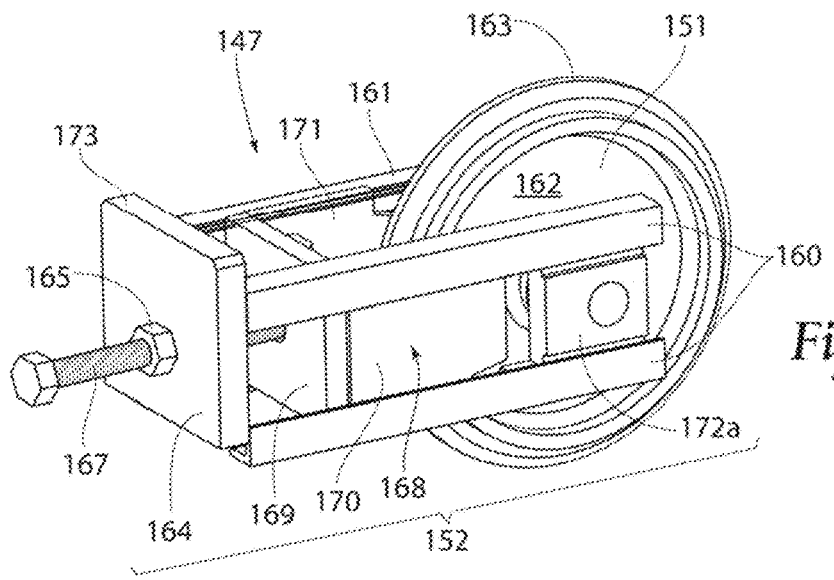
FIG. 13A is a perspective view of a track tensioner of the self-propelled boat launch vehicle of the present invention.
Figure 13B:
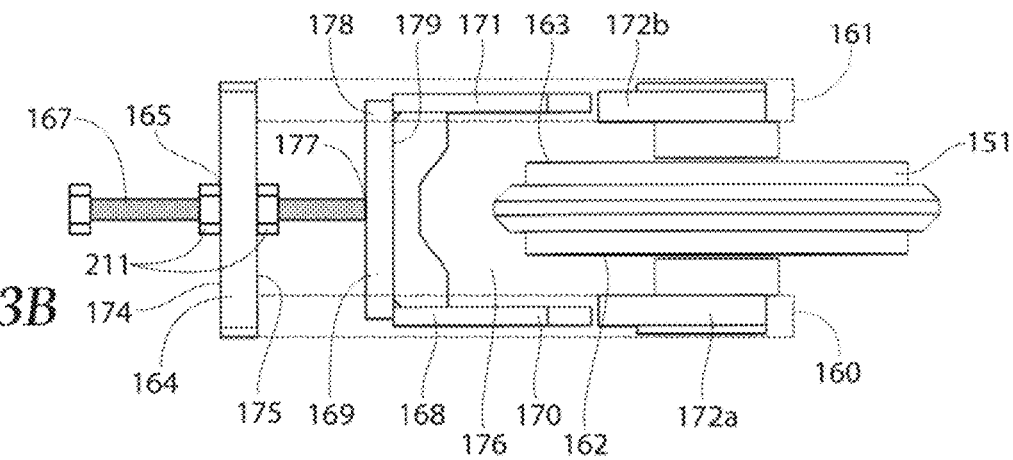
FIG. 13B is a top plan view of the track tensioner of the self-propelled boat launch vehicle of the present invention.
Figure 13C:
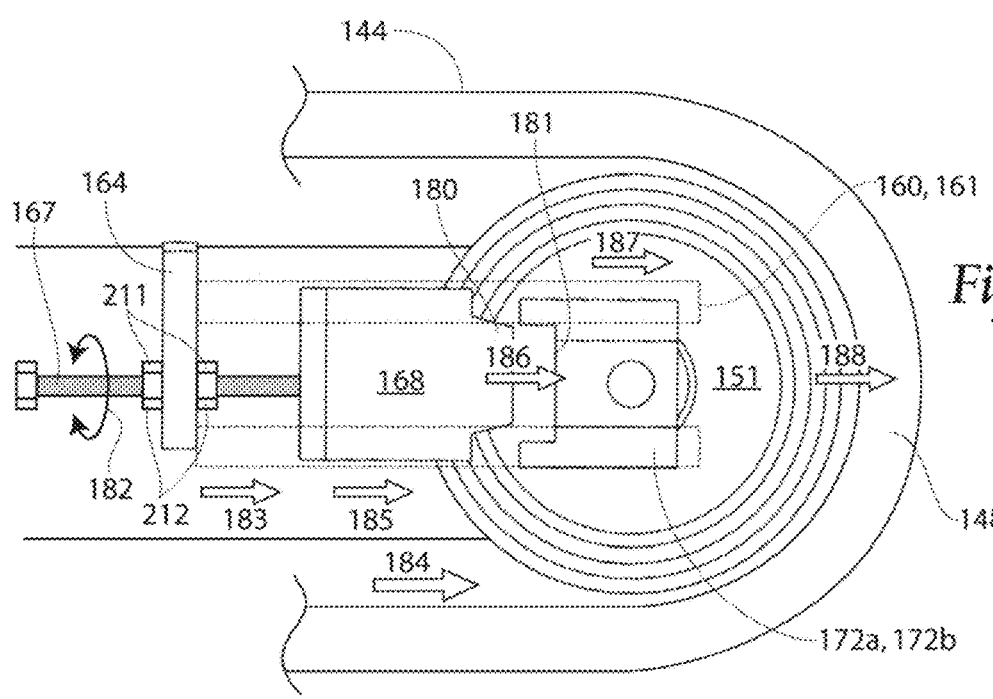
FIG. 13C is a side view of the track tensioner of the self-propelled boat launch vehicle of the present invention, illustrating a method of operating the track tensioner.

With attention to FIGS. 13A to 13C, the track tensioner 147 is further illustrated. The track tensioner 147 comprises a tensioner body 173 in slidable communication with a sliding bracket 168. The tensioner body 173 comprises first guide assembly 160, second guide assembly 161, and a tensioner body plate 164. The tensioner body plate 164 having a first plate face 174 and an oppositely opposed second plate face 175. Wherein the second plate face 175 is facing the track assembly second end 148 and at least substantially orthogonal to the track assembly length 149, as illustrated in FIG. 12B. At least one of the first guide assembly 160 and the second guide assembly 161 is attached to the tensioner body plate 164. Wherein at least one of the first guide assembly 160 and the second guide assembly 161 extending in the direction of the track assembly second end 148, reference FIG. 12B. Wherein the first guide assembly 160 and the second guide assembly 161 are substantially parallel. The first guide assembly 160 and the second guide assembly 161 define a guide assembly cavity 176, wherein the guide assembly cavity 176 provides for the idler wheel 151 and rotational movement of the idler wheel 151.

A body plate bore 165 extends from the first plate face 174 and thru the second plate face 175. A threaded bolt 167 extends from the first plate face 174, thru the bore 165 and beyond the second plate face 175. A threaded bolt first end 177 is in fixed communication with the sliding bracket 168. Specifically, the threaded bolt first end 177 is in fixed communication with a sliding bracket plate 169, and specifically the sliding bracket plate first side 178. Wherein the sliding bracket plate 169 is at least one at least substantially parallel to the second plate face 175 and at least substantially orthogonal to at least one of the first guide assembly 160 and the second guide assembly 161. Specifically, the threaded bolt first end 177 is in rotational communication with a sliding bracket plate 169, wherein rotation of the threaded bolt 167 provides for movement of the sliding bracket plate 169, and the sliding bracket 168, which is at least substantially parallel to the track assembly length 149. Alternatively, the threaded bolt 167 is in slidable communication with the body plate bore 165. At least one locking nut 211 is in threaded communication with the threaded bolt 167 to provide positional support and maintain the threaded bolt and sliding bracket in a fixed position.

At least one sliding bracket arm (170, 171) extends from a sliding bracket plate, second side 179, wherein the sliding bracket plate second side is opposite the sliding bracket plate first side 178. The first sliding bracket arm 170 is in slidable communication with the first guide assembly 160. The second sliding bracket arm 171 is in slidable communication with the second guide assembly 161.

The idler wheel 151 having a first idler wheel face 162 and an opposite second idler face 163, each at least substantially parallel to at least one of the first guide assembly 160 and the second guide assembly 161. Wherein the idler wheel 151 rotates at least substantially parallel to at least one of the first guide assembly 160 and the second guide assembly 161. An idler plate (172*a*, 172*b*) extends from at least one of the first idler wheel face 162 and an opposite second idler face 163. The first idler plate 172*a* is in slidable communication with the first guide assembly 160. The second idler plate 172*b* is in slidable communication with the second guide assembly 161. The sliding bracket arm (170, 171) positioned between the tensioner body plate 164 and the idler plate (172*a*, 172*b*) along at least one of the first guide assembly 160 and the second guide assembly 161.

As illustrated in FIG. 13C, it is observed the sliding bracket arm (170, 171) having a sliding bracket arm first end 180 extending from the sliding bracket plate 169 which may be in at least one of mateable communication, removable communication and slidable communication with an idler plate first end 181 of the idler plate (172*a*, 172*b*).

As illustrated in FIGS. 13A to 13C, a method of operating the track tensioner 152 is described. The threaded bolt 167 is advanced, 183. Advancing of the threaded bolt 167 may be by rotation in at least one of clockwise and counterclockwise, 182. Alternatively, advancing of the threaded bolt 167 may be thru slidable communication with the body plate bore 165. The threaded bolt 167 advances in a track assembly second end direction 184, 183. The movement of the threaded bolt 167 advances the sliding bracket in the track assembly second end direction 184, 185. The sliding bracket arm first end 180 removably contacts the idler plate first end 181 of the idler plate (172*a*, 172*b*), 186. The idler plate (172*a*, 172*b*) moves in the track assembly second end direction 184, 187. The idler wheel 151 moves in the track assembly second end direction 184, 188. At least one locking nut 211 in threaded communication with the threaded bolt 167 locking the threaded bolt 167 and providing positional support and maintaining the threaded bolt and sliding bracket in a fixed position, 212. The method provides for increased tension on the continuous track 144. The increased tension on the continuous track 144 provides for at least one of maintaining traction and increased traction of the self-propelled boat launch 2. It is observed the threaded bolt 167 may be rotated to remove contact between the sliding bracket arm first end 180 removably contacts the idler plate first end 181 of the idler plate (172*a*, 172*b*). Rotation of the threaded bolt 167 may be at least, one of clockwise and counterclockwise.

Figure 14A:
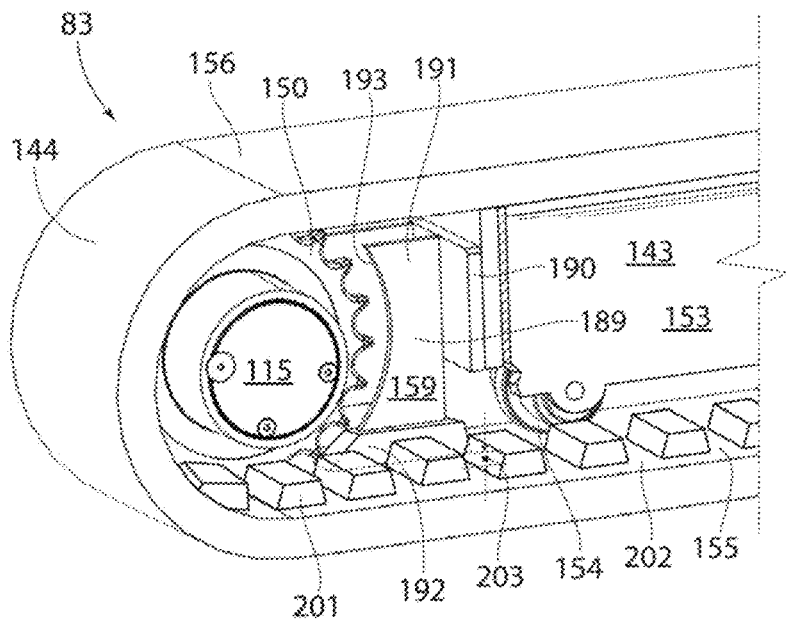
FIG. 14A is a close up perspective view of the track assembly of the self-propelled boat launch vehicle of the present invention, wherein a track cleaner is illustrated.
Figure 14B:
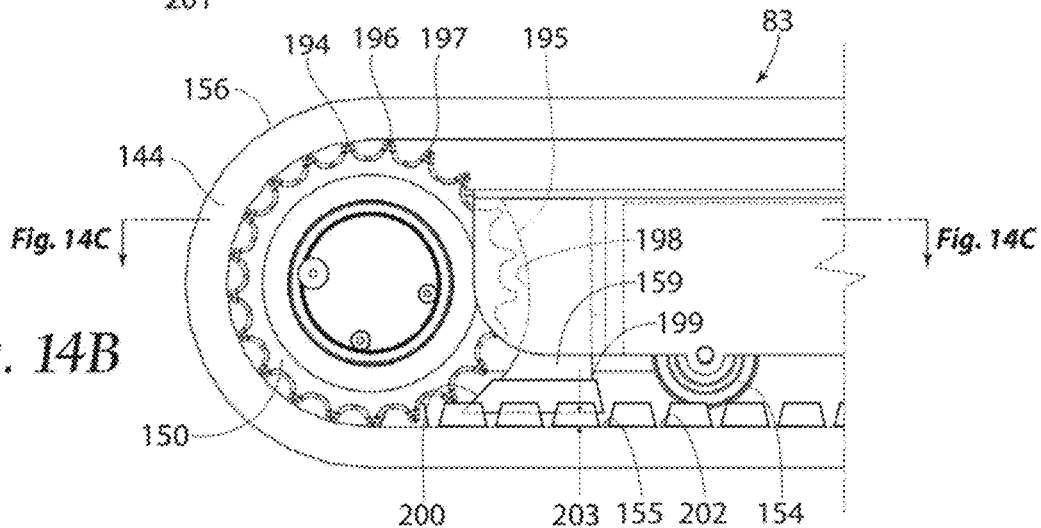
FIG. 14B is a close up side view of the track assembly of the self-propelled boat launch vehicle of the present invention, wherein the track cleaner is illustrated.

With attention to FIGS. 14A to 14B, the track cleaner 159 is further illustrated. The track cleaner 159 comprising a cleaner body 189 and cleaner base 190 in fixed communication. The cleaner base 190 in fixed communication with the track assembly body 143 in close proximity to the drive sprocket 150. The cleaner body 189 comprising a cleaner plate 191 and cleaner foot 192 in fixed communication. The cleaner plate 191 having a concave plate surface 193 proximate to the drive sprocket teeth 194. Wherein a concave plate surface arch 195 of the concave plate surface 193 compliments a drive sprocket outer circumference 196. The drive sprocket outer circumference 196 defined by drive teeth apices 197 of the drive sprocket teeth 194. Wherein the drive sprocket 150 rotates in close proximity to the concave plate surface arch 195. The drive sprocket 150 rotating along a concave plate surface arch circumference 198. At a cleaner plate first end 199 the cleaner foot 192 is in fixed communication with the cleaner plate 191. The cleaner foot 192 having an angled surface 200 facing the drive sprocket 150. Wherein the drive sprocket 150 rotates in close proximity to the angled surface 200. Specifically, at least one of the concave plate surface arch 195 and the angled surface 200 positioned in close proximity to the drive sprocket outer circumference 196. Further, at least one of the concave plate surface arch 195 and the angled surface 200 positioned in alignment with the drive sprocket outer circumference 196.

It is observed the track tread interior circumference 155 comprising at least cue row of continuous track nodes 201 extending at least substantially the track tread interior circumference 155. The cleaner foot 192 positioned in close proximity to the at least one row of continuous track nodes 201 at least, substantially parallel to the at least one row of continuous track nodes 201. The track cleaner 159, and specifically the cleaner foot 192, in close proximity to the interior circumference surface of the track tread 202. However, a distance 203 is provided between track cleaner 159, and specifically the cleaner foot 192, in close proximity to the interior circumference surface of the track tread 202. The positioning of the track cleaner 159 provides for removal of foreign object form the track tread assembly 83, and specifically the contiguous track 144 and the interior circumference surface of the track tread 202.

Figure 14C:
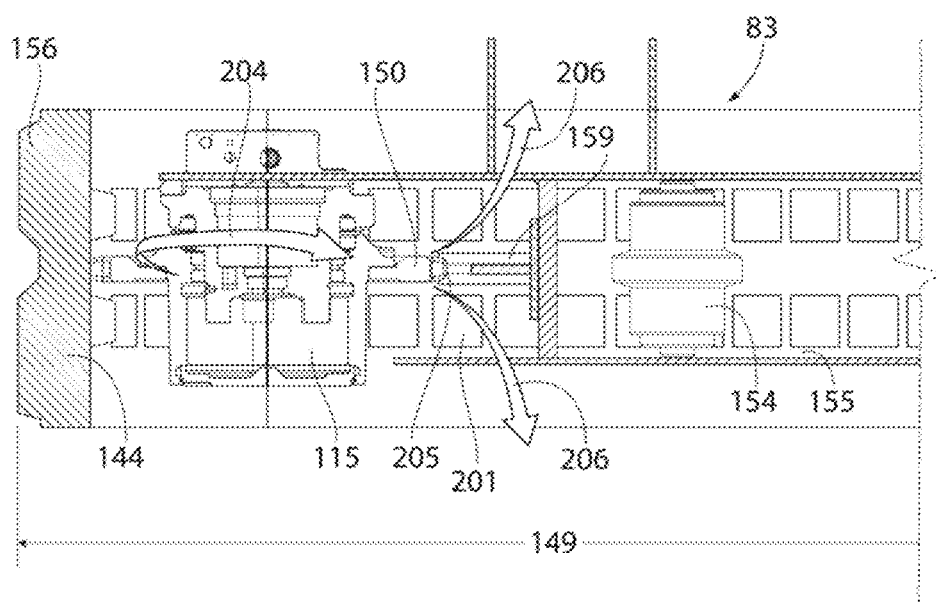
FIG. 14C is a close up sectional view of the track assembly of the self-propelled boat launch vehicle of the present invention, illustrating a method of operating the track cleaner.

With attention to FIGS. 14A to 14C, a method of operating the track cleaner is illustrated. The drive sprocket 150 rotates in close proximity to the track cleaner 159, specifically concave plate surface arch 195 and the angled surface 200, 204. Foreign object is positioned against the concave plate surface arch 195 and the angled surface 200, 205. Foreign object is advanced out of the track assembly 83 at least partially orthogonal to the track assembly length 149, 206.

While the detailed description of the preferred embodiments describes the boat launch vehicle as being self-propelled, the launch vehicle 2 could be unpowered for towing by vehicles including by way of non-limiting example, all-terrain vehicles (ATV's), Argo™ amphibious vehicles, trucks, automobiles, lawn tractors or the like.

While the detailed description describes the present invention as a boat launch vehicle, it is to be appreciated that the invention is adapted for use with numerous types of watercraft. In particular, the present invention is adapted not only for use in transporting and launching smaller power boats having a length less than about 35 feet, but also other personal watercraft including Seadoos™, sailboats, paddle boats or the like.

Although the detailed description describes and illustrates various preferred embodiments of the invention, the invention is not so limited. Many modifications and variations will now occur to persons skilled in the art.

An intended benefit of this invention is to provide for a track cleaner to reduce the amount of foreign objects in the track assembly allowing for continued and sustained operation of a self-propelled boat launch vehicle.

An intended benefit of this invention is to provide for a track tensioner to maintain operational tension on individual tracks in the track assembly allowing for continued and sustained operation of a self-propelled boat launch vehicle.

An intended benefit of this invention is to provide for a modular carriage frame construction to allow for multiple models of different sites to be produced with the same components.

An intended benefit of this invention is to provide for a construction allowing for extensions to be applied to address boats and small watercraft of various sizes.

It is observed at least one element of the first embodiment of the self-propelled boat launch 10 may be combined with at least one element of the second embodiment of the self-propelled boat launch 10'.

It is observed at least one element of the first embodiment of the self-propelled boat launch 10 may be combined with at least one element of the third embodiment of the self-propelled boat launch 10".

It is observed at least one element of the second embodiment of the self-propelled boat launch 10' may be combined with at least one element of the third embodiment of the self-propelled boat launch 10".

It is observed at least one element of the first embodiment of the modular carriage frame section 56 may be combined with at least one element of the second embodiment of the modular carriage frame section 56'.

It is observed at least one element of the first embodiment of the modular carriage frame section 56 may be combined with at least one element of the third embodiment of the modular carriage frame section 56".

It is observed at least one element, of the second embodiment of the modular carriage frame section 56' may be combined with at least one element of the third embodiment of the modular carriage frame section 56".

It is observed at least one element, of the manifold first embodiment 117 may be combined with at least one element of the manifold second embodiment 122.

It is observed at least one element of the first embodiment of the remote control 130 may be combined with at least one element of the second embodiment of the remote control 131.

The foregoing is considered as illustrative only of the principles of the invention. Furthermore, since numerous modifications and changes will readily occur to those skilled in the art, it is not desired to limit the invention to the exact construction and operation shown and described. While the preferred embodiment has been described, the details may be changed without departing from the invention.

We claim:

1. An improved self-propelled boat launch vehicle for launching or docking a boat in water including a submersible longitudinally elongated frame, in which said frame being movably supported on each longitudinal side by at least one track assembly having a track and a track assembly body located between an upper horizontal portion of said track and a lower horizontal portion of said track, in which said track assembly further includes a drive sprocket for a rotation of said track, wherein the improvement comprises:
      a track cleaner fixed to said track assembly body and in close proximity to said drive sprocket;
      said track cleaner comprising a cleaner plate and a rigid cleaner foot;
      said cleaner plate comprising a concave surface positioned proximate to a drive sprocket outer circumference;
      said rigid cleaner foot rigidly attached to a lower end of said cleaner plate;
      said rigid cleaner foot positioned proximate an interior surface of said track; and
      said rigid cleaner foot in a fixed position relative to said track.

2. The improved self-propelled boat launch vehicle of claim 1, further comprising said foot comprising an angled surface positioned in close proximity to said drive sprocket outer circumference.

3. The improved self-propelled boat launch vehicle of claim 1, further comprising at least one of said cleaner plate and said foot in alignment with said drive sprocket outer circumference.

4. The improved self-propelled boat launch vehicle of claim 1, further comprising said concave surface proximate to at least one drive tooth, positioned to define said drive sprocket outer circumference, wherein said tooth rotates in close proximity to said concave surface.

5. The improved self-propelled boat launch vehicle of claim 1, wherein said track cleaner is providing for removal of at least one object during said rotation of said track.

\* \* \* \* \*